(12) United States Patent
Hosaka

(10) Patent No.: US 6,956,311 B2
(45) Date of Patent: Oct. 18, 2005

(54) MAGNETIC MOTOR

(76) Inventor: Akira Hosaka, 10-23-304, Honchiba-machi, Chuo-ku, Chiba-shi, Chiba-ken 260-0014 (JP)

(*) Notice: Subject to any disclaimer, the term of this patent is extended or adjusted under 35 U.S.C. 154(b) by 0 days.

(21) Appl. No.: 10/471,531

(22) PCT Filed: Feb. 27, 2002

(86) PCT No.: PCT/JP02/01764
§ 371 (c)(1),
(2), (4) Date: Sep. 11, 2003

(87) PCT Pub. No.: WO02/073788
PCT Pub. Date: Sep. 19, 2002

(65) Prior Publication Data
US 2004/0119366 A1 Jun. 24, 2004

(30) Foreign Application Priority Data
Mar. 14, 2001 (JP) .................................... 2001-071724
Mar. 15, 2001 (JP) .................................... 2001-074939
Oct. 19, 2001 (JP) .................................... 2001-322710

(51) Int. Cl.$^7$ .............................................. H02K 21/12
(52) U.S. Cl. ........................ 310/156.38; 310/156.43; 310/156.47; 310/156.53; 310/156.56
(58) Field of Search ................ 310/152, 156.01–156.84

(56) References Cited

U.S. PATENT DOCUMENTS

| | | | | |
|---|---|---|---|---|
| 3,670,189 A | * | 6/1972 | Monroe ...................... | 310/46 |
| 4,100,441 A | * | 7/1978 | Landry ....................... | 310/103 |
| 4,629,921 A | * | 12/1986 | Gavaletz .................... | 310/156.01 |
| 4,751,486 A | * | 6/1988 | Minato ....................... | 335/272 |
| 5,594,289 A | * | 1/1997 | Minato ....................... | 310/152 |
| 6,144,130 A | * | 11/2000 | Kawamura ................. | 310/156.28 |
| 6,703,743 B2 | * | 3/2004 | Kaneko et al. ............ | 310/156.38 |

FOREIGN PATENT DOCUMENTS

| | | |
|---|---|---|
| JP | 61-295892 A | 12/1986 |
| JP | 62-277088 A | 12/1987 |
| JP | 64-12471 U | 1/1989 |
| JP | 05-284782 A | 10/1993 |
| JP | 06-253588 A | 9/1994 |
| JP | 06-335222 A | 12/1994 |
| JP | 07-031167 A | 1/1995 |
| JP | 07-303389 A | 11/1995 |
| JP | 08-098577 A | 4/1996 |
| JP | 08-336271 A | 12/1996 |
| JP | 09-322586 A | 12/1997 |
| JP | 10-126987 A | 5/1998 |
| JP | 10-248288 A | 9/1998 |
| JP | 11-355985 A | 12/1999 |
| JP | 2000-156946 A | 6/2000 |
| JP | 2000-228838 A | 8/2000 |

\* cited by examiner

*Primary Examiner*—Dang Le
(74) *Attorney, Agent, or Firm*—Kubovcik & Kubovcik

(57) ABSTRACT

A magnetic motor includes rotors having permanent magnets and rotatably disposed around a rotating axis, a magnetic sensor disposed at a periphery of the rotors and a plurality of electro-magnetic coils, and control means which controls electric current to the coils based on detection of magnetism from the magnets by means of the sensor. The rotor is equidistantly divided in a circumferential direction into the same number of regions as that of the coils. Each region includes a portion wherein a plurality of magnets are disposed in a circumferential direction and a portion wherein no magnets are disposed. Each magnet is disposed inclined against a radial line extending outwardly from the rotating axis. The control means switches the direction of electric current to the coils based on the signal from the sensor and supplies current after a lapse of predetermined time from the detection of magnetism by the sensor.

8 Claims, 14 Drawing Sheets

MAGNETIC MOTOR

TECHNIICAL FIELD

The present invention relates to an electrically operated motor. More specifically, the present invention relates to a magnetic motor comprises rotors having permanent magnets and rotatably disposed around a rotating axis, a magnetic sensor disposed at a periphery of the rotors and a plurality of electro-magnetic coils, and control means which controls electric current to the electro-magnetic coils based on detection of magnetism from the permanent magnets by means of the magnetic sensor, the rotor is equidistantly divided in a circumferential direction into a plurality of regions, the number of which is the same as that of the electromagnetic coils, each region comprises a portion wherein a plurality of permanent magnets are disposed in a circumferential direction and a portion wherein no permanent magnets are disposed, each permanent magnet is disposed inclined against a radial line extending outwardly from the rotating axis.

BACKGROUND ART

In many electrically operated motors which have been conventionally known, electromagnets consisting of a coil winding are used for both a rotor and a stator. In addition, there is a stepping motor, wherein a magnetic body or a permanent magnet is used for a rotor and electromagnetic coils are used for a stator. However, this stepping motor needs a special device to control the phase.

The present inventor proposed the following motor in Japanese Patent Application Laid-open No. Hei 10-126987. The motor comprises a rotor rotatable about an axis of rotation and electromagnetic coils arranged around said rotor, said rotor is equidistantly sectioned into a plurality of regions in a circumferential direction, each region is provided with a part wherein a plurality of permanent magnets are adjacently provided and another part wherein no permanent magnet is disposed, said permanent magnet is disposed inclining against a radial line which extends outward from said axis of rotation, said rotor includes a disc and a circumferential plate which is connected to a circumferential edge of said disc, and said plurality of permanent magnets are arranged on the inside of said circumferential plate.

As described above, the rotor is rotatably supported and has a plurality of permanent magnets disposed inclining against radial lines which extend outward from said axis of rotation, and when the electromagnetic coils are not supplied with electric current, the rotor stops after it rotates due to magnetic action between magnetic lines of force formed by a plurality of permanent magnets and the electromagnetic coil to a position wherein a permanent magnet located at an end of a plurality of permanent magnets faces to the electromagnetic coil. Under this condition, if the polarity of the magnetic coil is changed to the polarity which is the same as that of the facing permanent magnet, the magnetic body and the permanent magnet repulse each other, and the rotor rotates.

In such a motor, in order to continuously and effectively rotate the rotor, it is necessary to detect that the permanent magnets on the rotor locate at a predetermined positional relationship relative to the electromagnetic coils and control electric current supply to the electromagnetic coils.

In Japanese Patent Application Laid-open No. Hei 10-248288, proposed is a device wherein rotors L1 and L2 are mounted on a spindle M, magnetic sensors H1 and H2 are disposed between an iron core O1 and the rotor L2, the iron core O1 facing the rotor L1 has driving coils K1, K3 and K5, the iron core O1 facing the rotor L2 has driving coils K2, K4 and K6, the rotor L1 and L2 have permanent magnets J with aligned magnetic polarities disposed thereon, the driving coils are connected in order of K1, K2, K3, K4, K5 and K6, the driving coil K1 has a lead line X, the driving coil K6 has a lead line Y, transistors Tr1 and Tr3 and transistors Tr2 and Tr4 are disposed between power source V and power ground G, respectively, inverters IC A1–A6 are disposed between the transistors Tr1–Tr4 and magnetic sensors H1 and H2, the transistors Tr1–Tr4 have diodes D2, D3, D4 and D5 bridged therebetween, a double toggle switch is disposed between the power source V and the magnetic sensors H1 and H2, the lead line X from the driving coil K1 is connected between the transistors Tr1 and Tr3, and the lead line Y from the driving coil K6 is connected between the transistors Tr2 and Tr4.

In this device, the magnetic sensor H1 which detects the N Pole of the permanent magnets J outputs and a digital low signal is transmitted to the inverters IC A1, A2, A4 and A6. The input signal is inverted in the inverters IC, and the output of the inverters IC A1 and A2 becomes a digital high signal. Further, the signal input into the inverters IC A4 and A6 is inverted twice, and the output of the inverters IC A3 and A5 becomes a low signal. The transistors Tr1 and Tr2 are PNP transistors, and transistors Tr3 and Tr4 are NPN transistors.

The transistor Tr1 which receives the output signal of the inverter Ic is not energized since it is in off condition. The transistor Tr2 becomes in on condition when it receives low signal and is energized, the transistor Tr3 becomes in on-condition when it receives high signal and is energized, the transistor Tr4 is in off-condition and is not energized, and when low signal is input into the inverters IC A1, A2, E4, and A6, the transistors Tr2 and Tr3 are energized and electric current flows from the lead line X toward the lead line Y.

Contrary to this, when digital high signal is input into the inverters IC A1, A2, A4 and A6, the transistors Tr1 and Tr4 are energized and electric current flows from the lead line Y toward the lead line X.

When electric current flows from the lead line X toward the lead line Y, the side of the driving coil K1 facing the rotor becomes S pole, and the side of the driving coil K2 facing the rotor also becomes S pole. Further, all the sides of the driving coil K3, K4, K5 and K6 facing the rotor becomes S pole. The thus appeared S pole and the S pole of the permanent magnets J repulse each other, and the rotors L1 and L2 rotate in a clockwise direction by 60°, where the output of the magnetic sensor H1 is reversed, and electric current flows from the lead line Y toward the lead line X. Then, the side of each driving coil facing the rotor becomes N pole which is reverse to the former polarity. When the N pole repulses the N pole of the permanent magnets J and at the same time attracts the S pole of the permanent magnets J, the rotors L1 and L2 further rotate in a clockwise direction by 60°. Repetition of these operations, the rotors L1 and L2 continuously rotate in a clockwise. The double toggle switch S changes the operating magnetic sensor from H1 to H2, so as to rotate the rotors in an opposite direction by changing the switching timing.

In the device disclosed in Japanese Patent Application Laid-open No. Hei 10-248288, energizing and dis-energizing of the transistors Tr2 and Tr3, and Tr1 and Tr4 are changed by means of the signal from the magnetic sensor H1 or H2, and electric current flows from the lead line X toward the lead line Y, or from the lead line Y toward the lead line X. Theoretically, the electric current flow from the lead line X toward the lead line Y and the electric current flow from the lead line Y toward the lead line X do not occur simultaneously. However, actually, depending on the component characteristics of the transistors Tr1 to Tr4, energizing of the transistor Tr2 and Tr3 and energizing of the transistors T12 and T43 may be overlapped, and as a result, electric current does not flow in the motor but passes through from the electric power V to the power ground G, and thus there is electric current which does not contribute to rotation of the motor.

Such passing through electric current causes problems that the output torque of the motor decreases, the rotation of the motor becomes unstable and the efficiency of the motor decreases. The problems become remarkable as the rotational speed of the motor becomes high.

It is an object of the present invention to obviate the above-described problems and provides a motor which can further enhance the rotational speed and by which higher efficiency can be achieved.

Further, in Japanese Patent Application Laid-open No. Hei 10-126987, proposed is a production method of a motor characterized in that:

a plurality of radial lines are drawn at an equal circumferential angle from a center point;

outlines of permanent magnets of a rectangular section are drawn at a predetermined inclination angle relative to said radial line from starting points on said radial lines locating at a predetermined distance from the center point;

a jig having a recess connecting outlines of said permanent magnets is prepared;

a plurality of permanent magnets are put along the recess of said jig; and after relative position of said plurality of permanent magnets is fixed, said permanent magnets are mounted on a rotor body to produce a rotor.

Even when the production method disclosed in the above-described Japanese Patent Application Laid-open No. Hei 10-126987 which uses a specially designed jig is applied, since a plurality of permanent magnets having a rectangular cross section are disposed side by side, the sides of the permanent magnets closely and magnetically attract each other when permanent magnets having large magnetic strength are used. Accordingly, high assembling technique is still required for putting a plurality of permanent magnets inclining relative to the radial line extending from the center point and putting ends along the circular recess. Thus, the motor production efficiency is still low.

Further, in the rotor disclosed in Japanese Patent Application Laid-open No. Hei 10-126987, a plurality of permanent magnets are arranged on a flat circular disc. As a result, the permanent magnets may hit the circumferential plate due to the centrifugal force caused by the high speed rotation, and the circumferential plate is bulged or broken. Thus, there is a problem that the high speed rotation of the motor is limited.

It is another object of the present invention to obviate the problems inherent to the rotors disclosed in Japanese Patent Application Laid-open No. Hei 10-126987 that assembling is not easy and that there is a limit for the high speed rotation. Thus, the present invention provides a magnetic motor which can be assembled without requiring special skill with high production efficiency, and which has large strength, and which can be rotated at a high speed.

DISCLOSURE OF THE INVENTION

According to the present invention, the above-described objects are achieved by a magnetic motor comprises a rotor having permanent magnets and rotatably disposed about an axis of rotation, a magnetic sensor disposed at a periphery of the rotor, a plurality of electro-magnetic coils, and control means which controls electric current to the electromagnetic coils based on detection of magnetism from the permanent magnets by means of the magnetic sensor, the rotor being equidistantly divided in a circumferential direction into a plurality of regions, the number of which is the same as that of the electro-magnetic coils, each region comprising a portion wherein a plurality of permanent magnets are disposed in a circumferential direction and a portion wherein no permanent magnets are disposed, each permanent magnet being disposed inclined against a radial line extending outwardly from the rotating axis, characterized in that the current supply control means switches the direction of the electric current to the electro-magnetic coils based on the signal from the magnetic sensor and supplies electric current after a lapse of predetermined time from the detection of magnetism by means of the magnetic sensor.

More specifically, the present invention achieves the above-described objects by a magnetic motor comprises a rotor having permanent magnets and rotatably disposed about an axis of rotation, a magnetic sensor disposed at a periphery of the rotor, a plurality of electro-magnetic coils, and control means which controls electric current to the electro-magnetic coils based on detection of magnetism from the permanent magnets by means of the magnetic sensor, the rotor being equidistantly divided in a circumferential direction into a plurality of regions, the number of which is the same as that of the electro-magnetic coils, each region comprising a portion wherein a plurality of permanent magnets are disposed in a circumferential direction and a portion wherein no permanent magnets are disposed, each permanent magnet being disposed inclined against a radial line extending outwardly from the rotating axis, characterized in that a first transistor and a second transistor are connected in series, a third transitor and a fourth transistor are connected in series, and the first and second transistors connected in series and the third and fourth transistors connected in series are connected in parallel, one of terminals of the electro-magnetic coils is connected between the first and second transistors, the other terminal of the electro-magnetic coils is connected between the third and fourth transistors, a gate or base of each transistor is connected to the current supply control means, and the current supply control means switches the direction of the electric current to the electro-magnetic coils based on the signal from the magnetic sensor and supplies electric current to the electro-magnetic coils after a lapse of predetermined time from the detection of magnetism by means of the magnetic sensor.

It is preferred that the current supply control means switches the direction of the electric current to the electro-magnetic coils based on the signal from the magnetic sensor and the control means includes a delay circuit comprising a capacitor and a resistance so as to supply electric current to the electro-magnetic coils after a lapse of predetermined time from the detection of magnetism by means of the magnetic sensor. In this occasion, it is preferred that the delay circuit and each of transistors are connected to each other via photocoupler.

Alternatively, the current supply control means may include a clock pulse generating means and may switch the direction of the electric current to the electro-magnetic coils based on the signal from the magnetic sensor in synchronism with clock pulse generated from the clock pulse generating means.

Further, it is preferred that the current supply control means includes a clock pulse generating means and a flip-flop means, and the signal from the magnetic sensor and clock pulse from the clock pulse generating means are input into the flip-flop means so that the direction of the electric current to the electro-magnetic coils is switched based on the output signal from the flip-flop means.

More specifically, it is preferred that a magnetic motor comprises a rotor having permanent magnets and rotatably disposed about an axis of rotation, a magnetic sensor disposed at a periphery of the rotor, a plurality of electro-magnetic coils, and control means which controls electric current to the electro-magnetic coils based on detection of magnetism from the permanent magnets disposed on the rotor by means of the magnetic sensor, the rotor being equidistantly divided in a circumferential direction into a plurality of regions, the number of which is the same as that of the electro-magnetic coils, each region comprising a portion wherein a plurality of permanent magnets are disposed in a circumferential direction and a portion wherein no permanent magnets are disposed, each permanent magnet being disposed inclined against a radial line extending outwardly from the rotating axis, characterized in that the current supply control means includes: a clock pulse generating means; and a logic circuit connected to the clock pulse generating means and the magnetic sensor, the logic circuit comprises:

a first logic circuit which is turned on by a normal clock pulse generated after receiving off-signal from the magnetic sensor and which is turned off by a reverse clock pulse generated after receiving on-signal from the magnetic sensor; and a second logic circuit which is turned on by a normal clock pulse generated after receiving on-signal from the magnetic sensor and which is turned off by a reverse clock pulse generated after receiving off-signal from the magnetic sensor, a first field effect transistor having a gate connected to the first logic circuit and a second field effect transistor having a gate connected to the second logic circuit are connected in series, a third field effect transistor having a gate connected to the second logic circuit and a fourth field effect transistor having a gate connected to the first logic circuit are connected in series, and the first field effect transistor and the second field effect transistor connected in series and the third field effect transistor and the fourth field effect transistor connected in series are connected in parallel, one of terminals of the electromagnetic coils is connected between the first and second field effect transistors, and the other terminal of the electromagnetic coils is connected between the third and fourth field effect transistors, the direction of the electric current to the electro-magnetic coils is switched based on the signal from the magnetic sensor and the clock pulse generated from the clock pulse generating means.

Further, as illustrated in the embodiment, the present invention preferably provides a magnetic motor comprises a rotor having permanent magnets and rotatably disposed about an axis of rotation, a magnetic sensor disposed at a periphery of the rotor, a plurality of electro-magnetic coils, and control means which controls electric current to the electro-magnetic coils based on detection of magnetism from the permanent magnets disposed on the rotor by means of the magnetic sensor, the rotor being equidistantly divided in a circumferential direction into a plurality of regions, the number of which is the same as that of the electro-magnetic coils, each region comprising a portion wherein a plurality of permanent magnets are disposed in a circumferential direction and a portion wherein no permanent magnets are disposed, each permanent magnet being disposed inclined against a radial line extending outwardly from the rotating axis, characterized in that the current supply control means includes: a clock pulse generating means; and a logic circuit connected to the clock pulse generating means and the magnetic sensor, the clock pulse generating means is capable of generating normal clock pulses of a predetermined frequency and reverse clock pulse which are obtained by reversing the normal clock pulses, the logic circuit includes a flip-flop circuit and a NOR circuit connected to the flip-flop circuit, the flip-flop circuit comprises: a first flip-flop circuit to which clock pulses from the clock pulse generating means and the signal from the magnetic sensor are input; and a second flip-flop circuit to which reverse clock pulses from the clock pulse generating means and the signal from the magnetic sensor are input, and the NOR circuit comprises: a first NOR circuit to which normal output from the first flip-flop circuit and normal output from the second flip-flop circuit are input; and a second NOR circuit to which reverse output from the first flip-flop circuit and reverse output from the second flip-flop circuit are input, the first NOR circuit is turned on by a normal clock pulse generated after receiving off-signal from the magnetic sensor and is turned off by a reverse clock pulse generated after receiving on-signal from the magnetic sensor, and the second NOR circuit is turned on by a normal clock pulse generated after receiving on-signal from the magnetic sensor and is turned off by a reverse clock pulse generated after receiving off-signal from the magnetic sensor, a first field effect transistor having a gate connected to the first NOR circuit and a second field effect transistor having a gate connected to the second NOR circuit are connected in series, a third field effect transistor having a gate connected to the second NOR circuit and a fourth field effect transistor having a gate connected to the first NOR circuit are connected in series, and the first field effect transistor and the second field effect transistor connected in series and the third field effect transistor and the fourth field effect transistor connected in series are connected in parallel, one of terminals of the electromagnetic coils is connected between the first and second field effect transistors, and the other terminal of the electro-magnetic coils is connected between the third and fourth field effect transistors, the direction of the electric current to the electro-magnetic coils is switched based on the signal from the magnetic sensor and the clock pulse generated from the clock pulse generating means.

In this case, the first flip-flop circuit and the second flip-flop circuit may be D flip-flop.

In addition, according to the present invention, it is preferred that a magnetic motor according to any one of claims 1 to 9 characterized in that the rotor includes a circular disc and a circular peripheral plate connected to the periphery of the disc, the plurality of permanent magnets are disposed inside the circular peripheral plate and the peripheral portions where the permanent magnets are disposed are open.

According to the present invention, the rotor is equidistantly divided in a circumferential direction into a plurality of regions, each region comprises a portion wherein a plurality of permanent magnets are disposed in a circumferential direction and a portion wherein no permanent magnets are disposed, and it is preferred that both the portion wherein permanent magnets are disposed and the portion wherein no permanent magnets are disposed are almost the same. Further, the plurality of permanent magnets disposed in a circumferential direction are disposed in such manner that S pole and N pole are alternately aligned in the circumferential direction, and the permanent magnets are disposed inclined against a radial lines extending outwardly from the rotating axis, the S pole may face outward, or contrary to this, N pole may face outward.

When a plurality of rotors are overlapped in an axial direction, it is preferred that the rotors are shifted in a radial directions and are fixed to the spindle so that at least permanent magnets on the adjacent rotors do not overlap. For example, when the number of the rotors is two, the portion having permanent magnets disposed on one rotor and the portion having no permanent magnets disposed on the other rotor are overlapped. Further, when the number of the rotors is four, ever other rotors are so arranged that the phase of the portions having permanent magnets disposed are aligned.

According to the present invention, it is preferred that as illustrated in the embodiment, the rotor is divided into three regions in a circumferential direction, and each of the permanent magnets is disposed inclined in a range between 35 and 60° (angle indicated by β in FIG. 3) against a radial line extending outwardly from the rotating axis, or the rotor is divided into four regions in a circumferential direction, and each of the permanent magnets is disposed inclined in a range between 40 and 55° against a radial line extending outwardly from the rotating axis. When the diameter of the rotor is equal to or less than 30 mm, it is preferred that inclination angle against a radial line is between 35° and 45°.

Further, according to the present invention, it is preferred that the rotor is divided into three regions in a circumferential direction, and the permanent magnets are disposed gradually inclined from 45° to 60° against a radial line extending outwardly from the rotating axis.

Further, according to the present invention, the above-described object is achieved by a magnetic motor comprises a rotor having permanent magnets and rotatably disposed about an axis of rotation, a magnetic sensor disposed at a periphery of the rotor, a plurality of electro-magnetic coils, and control means which controls electric current to the electro-magnetic coils based on detection of magnetism from the permanent magnets by means of the magnetic sensor, the rotor being equidistantly divided in a circumferential direction into a plurality of regions, each region comprising a portion wherein a plurality of permanent magnets are disposed and a portion wherein no permanent magnets are disposed, each permanent magnet being disposed inclined against a radial line extending outwardly from the rotating axis, the rotor is a solid circular member made of non-magnetic body, the circular member has recesses or holes formed therein for accommodating therein the plurality of permanent magnets inclined against radial lines, and the plurality of permanent magnets are accommodated in the recesses or holes.

According to the present invention, the rotor comprises a rotor body of solid circular member made of non-magnetic body, and a plurality of permanent magnets accommodated in recesses or holes formed in the rotor body.

Due to this construction, upon assembly, one of the plurality of permanent magnets is accommodated in the recess or hole formed in the rotor body, and while the permanent magnet is accommodated in the recess or hole, the next permanent magnet is installed into the recesses or holes, the next magnet is guided into the recesses or holes due to the magnetic force of both the magnets and is secured to a predetermined position in the recesses or holes. Repeating the similar operation, a plurality of permanent magnets are installed into the recesses or holes one by one. Thus, without requiring special skill, all the magnets are installed into the predetermined positions in the recesses or holes, and accordingly, production efficiency upon assembly is highly enhanced.

In the present invention, the rotor body is constructed by a solid circular member made of non-magnetic body, and a plurality of permanent magnets are accommodated in the recesses or holes formed in the circular member. Due to this construction, even if centrifugal force is acted on the permanent magnet during a high speed rotation, the rotor body is not deformed nor damaged, and the permanent magnets are surely held, and accordingly, the magnetic motor can rotate at a high speed.

According to the present invention, it is preferred that the recesses or holes formed in the circular member extend in an axial direction (the direction of thickness) of the circular member, and inner walls of the recesses or holes are engaged with at least inner side ends and outer side ends of the plurality of permanent magnets.

Due to this construction, both the ends (end facing the inner side and end facing the outer side) of each permanent magnet engage with the inner walls of the recesses or holes formed in the circular member and are surely held. Further, the ends of each permanent magnet are not contact with ends of the other permanent magnet due to magnetic attraction, magnetic lines of force extending between the ends of each permanent magnet are not obstructed, and accordingly, the high speed rotation of the magnetic motor is further ensured.

In this occasion, in order to smoothly rotate the rotor due to magnetic coupling between the permanent magnets and the electromagnetic coils and enhance high speed rotation of the magnetic motor, it is preferred that the recesses or holes formed in the circular member are so shaped that they accommodate the plurality of permanent magnets therein such that their inclinations relative to the radial line are different.

Further, it is preferred to achieve high speed rotation of the magnetic motor that the outside of portion in the circular member where the permanent magnets are disposed is open, since magnetic lines of force extending from the permanent magnets are not obstructed, and since magnetic coupling between the permanent magnets and the electromagnetic coils is achieved.

In addition, in the present invention, it is preferred that non-magnetic body constituting the circular member is made of carbon resin as a principal component. Thus, the weight of the rotor becomes light and the strength of the rotor can be enhanced, and high speed rotation of the magnetic rotor can be done.

BEST MODE FOR CARRYING OUT THE INVENTION

Figure 1:
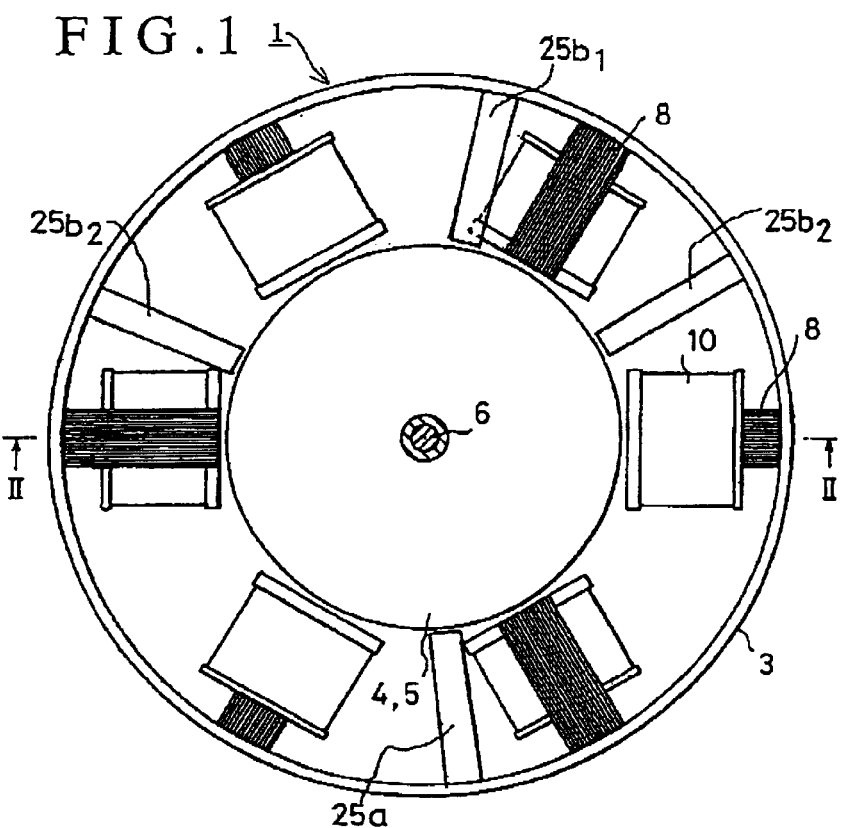
FIG. 1 is a plan view of an embodiment of a motor according to the present invention, wherein one side is removed.
Figure 2:
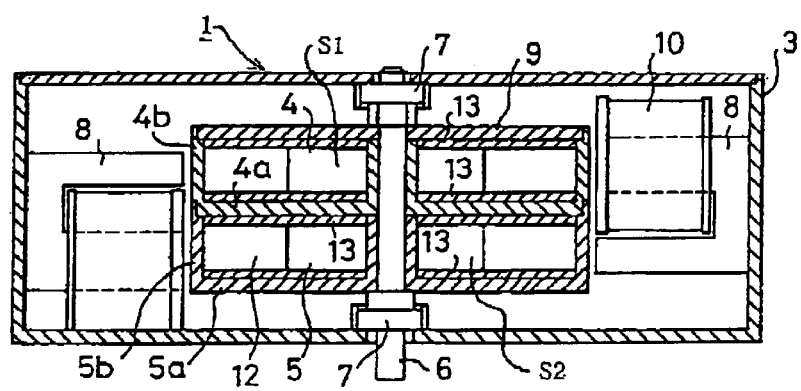
FIG. 2 is a cross sectional view along line II—II in FIG. 1.

The present invention will now be explained in detail with reference to the attached drawings which illustrate an embodiment of the present invention, wherein:

FIG. 1 is a plan view of an embodiment of a motor according to the present invention, wherein one side is removed;

FIG. 2 is a cross sectional view along line II—II in FIG. 1; and

Figure 3:
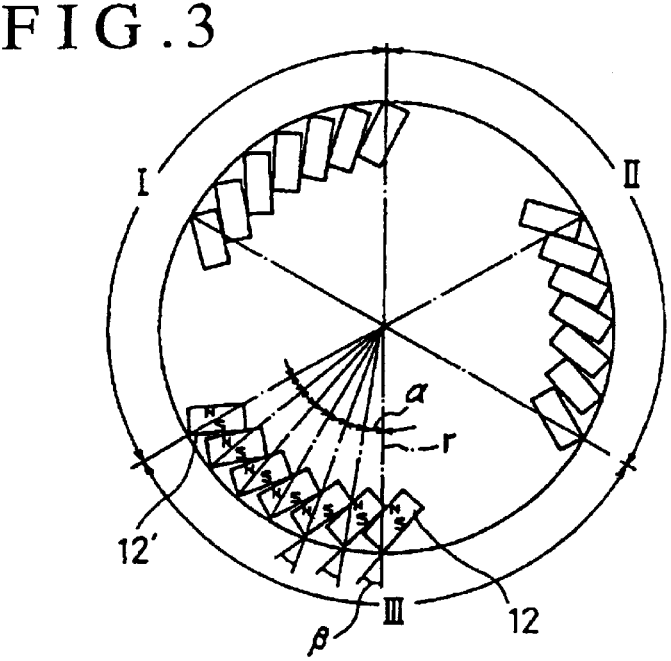
FIG. 3 is a plan view showing arrangement of permanent magnets on a rotor.

FIG. 3 is a plan view showing arrangement of permanent magnets on a rotor.

As illustrated in FIGS. 1 and 2, a motor 1 is received in a cylindrical case 3 in this embodiment. Vertically overlaid rotors 4 and 5 are adjacent to each other and are mounted on a spindle 6. The spindle 6 is rotatably supported by a pair of bearings 7, and the vertically overlaid rotors can rotate together with the spindle 6.

Near periphery of each rotor 4 or 5, six laminated iron cores 8 are disposed equidistantly about an axis of the spindle 6. In each laminated iron core 8, laminated are 20 pieces of iron plates having 0.5 mm depth, for example, and a cross-section of ⊐, respectively. More specifically, the laminated iron cores 8 are disposed at intervals of 60°. At the six laminated iron cores 8 adjacent to the upper rotor 4, electromagnetic coils 10 are inserted at every other cores. In other words, electromagnetic coil 10 are disposed at intervals of 120° so as to face the upper rotors 4. On the other hand, at the six laminated iron cores 8 adjacent to the lower rotor 5, electromagnetic coils 10 are inserted into the cores where the above-described electormagnetic coils have not been inserted at intervals of 120°. Therefore, electromagnetic coils 10 facing the adjacent upper or lower rotor 4 or 5 are mutually located between the other electromagnetic coils 10 of the other rotor 5 or 4 as illustrated in FIG. 1.

Furthermore, a magnetic sensor 25 which detects phase of the rotors 4 and 5 by permanent magnet 12 of the rotors 4 and 5 and which controls energization of the electromagnets is disposed in the case 3. For the magnetic sensor 25, hole device or MRE (Magneto-Resistance Effect) device may be used and the magnetic detecting portion of the magnetic sensor 25 is disposed just adjacent to the outer periphery of the rotor. In this embodiment, a hole device is used for the magnetic sensor 25, which turns on and off depending on the strength and weakness of the magnetic field of S pole of the magnet, and which emits on-signal when S pole is not detected, and which turns off when S pole is detected in the embodiment. In the illustrated embodiment, a magnetic sensor 25a for forward rotation (clockwise rotation) of the rotor is disposed adjacent to the upper rotor 4, and three magnetic sensors 25b for backward rotation (anti-clockwise rotation) of the rotor are disposed (the magnetic sensor $25b_1$ is disposed adjacent to the upper rotor 4, and two magnetic sensors $25b_2$ are disposed adjacent to the lower rotor 5). The number of the magnetic sensors may be single or plural depending on object, and use.

The six electromagnetic coils 10 are so connected that their polarity in energization becomes the same and are connected to a direct current power supply so that DC voltage is applied by means of the sensor 25 and a current supply means at a predetermined timing as will be explained later.

The rotors 4 and 5 are made of non-magnetic bodies such as aluminum, magnesium alloy or plastic. As illustrated in FIG. 2, each of the vertically overlaid rotors 4 and 5 includes a disc 4a or 5a and circumferential plate 4b or 5b connected to the disc 4a or 5a, respectively, and is formed in a shallow cylinder shape. It is preferred that the peripheral plates 4b and 5b are open at portions locating outside the permanent magnets as will be described later and that the thickness of the peripheral plates 4b and 5b is as thin as possible so that magnetic lines of force from the permanent magnets 12 to the laminated iron cores 8 or the electromagnetic coils 10 inserted into the laminated iron cores 8 are not obstructed.

The upper inner surface of the peripheral plates of the lower rotor 5 and the lower outer surface of the peripheral plates of the upper rotor 4 are cut, respectively, and they can be engaged with each other at the cut portions of the upper and lower rotors 4 and 5. Furthermore, a cover 9 is fitted over the upper opening of the upper rotor 4, and, as a whole, two spaces S1 and S2 are formed within the upper and lower rotors 4 and 5.

In the embodiment illustrated in FIG. 2, the two spaces S1 and S2 have sheets 13 formed in doughnut shape and made of a magnetic body such as an iron plate mounted at the top and bottom thereof, respectively, and permanent magnets 12 are arranged between these sheets 13. According to this arrangement, magnetic lines of force created by the permanent magnets 12 circulate through the upper and lower sheets 13. Because of this, any leakage of magnetic force does not occur, the rotors 4 and 5 can be rotated at high speed, and high torque can be generated.

An arrangement of the permanent magnets 12 of the rotors 4 and 5 is illustrated in FIG. 3. The rotors 4 and 5 are equidistantly sectioned into a plurality of (three in FIG. 3) regions I, II and III in a circumferential direction. Each region I, II or III has portions wherein a plurality of permanent magnets 12 are adjacently disposed therein and portions wherein no permanent magnets 12 are disposed therein. In the embodiment illustrated in FIG. 3, seven permanent magnets 12, each having an approximately rectangular cross section, are disposed in each region I, II or III in such a manner that S pole and N pole are adjacent to each other. It is preferred that the number of the permanent magnets 12 disposed in each portions are changed depending on the number of portions, and in the illustrated embodiment, the number of the portions is three as described above, and the number of the permanent magnets is seven. However, the numbers may be changed depending on the diameter of the rotor and so on. For example, if the number of the portions is four, the number of the permanent magnets 12 may be six.

In this embodiment, the rotors 4 and 5 are overlaid with shifting the phases of the permanent magnets on the rotors 4 and 5 in such manner that the permanent magnets 12 of the rotor 5 locate between the permanent magnets 12 of the rotor 4.

The permanent magnets 12 are disposed inclining so as to form an inclination angle β, which is between 35° and 60° against a plurality of radial lines r, which extend outward from the axis of rotation of the spindle 6 forming an angle of circumference α therebetween. The angle β may be the same for all the permanent magnets, and alternatively, it may be slightly different for each permanent magnet 12 as illustrated in FIG. 3. The preferable range of angle β changes depending on the number of the portions, and in the illustrated embodiment, the number of the portion is three as described above, and angle β between 40° and 60° is preferable. However, for example, if the number of portions is four, it is preferred that angle β is set between 40° and 55°. However, the number of the permanent magnets may be different from that in case of three portions.

Each permanent magnet 12 is so disposed that its tip locating at the peripheral side is close near or in contact with the inside of the peripheral plate 4b or 5b. Due to this construction, even if the rotors 4 and 5 are rotated at high speed, the permanent magnets 12 of the rotors 4 and 5 are prevented from being scattered by centrifugal force. Accordingly, it is stable at high speed, and it can be rotated for a long time. Further, the peripheral plate 4b or 5b are open at portions locating outside the permanent magnets 12 so that magnetic lines of force from the permanent magnets 12 to the laminated iron cores 8 or the electromagnetic coils 10 inserted into the iron cores 8 are not obstructed.

The permanent magnets 12 to be used in the present invention is preferably Lanthanum-Cobalt type ferrite magnet FB9 series made by TDK Corporation, especially, FB9 or product higher level than it. It is subjected to a magnetizing operation, after it is molded in a predetermined shape. In this occasion, material to be permanent magnets 12 has to be molded into a relatively simple shape because a desired magnetizing operation cannot be done when material to be the permanent magnet 12 is formed in a complicated shape.

According to the present invention, since a plurality of rectanglar sectioned permanent magnets 12 are adjacently disposed as described above, the permanent magnets may magnetically adhere to each other at their sides in a coherence state when permanent magnets of a strong magnetic force are used. Accordingly, it is very difficult to dispose one of poles of a plurality of permanent magnets at the outside and the other pole at a position offset from the center and along a circular arc, and accordingly, the production efficiency of the motor is extremely low. In order to obviate this problem, according to the present invention, it is preferred to use specially designed jig such as disclosed in Japanese Patent Application Laid-open No. Hei 10-126987 and assemble the permanent magnets 12.

Figure 4:
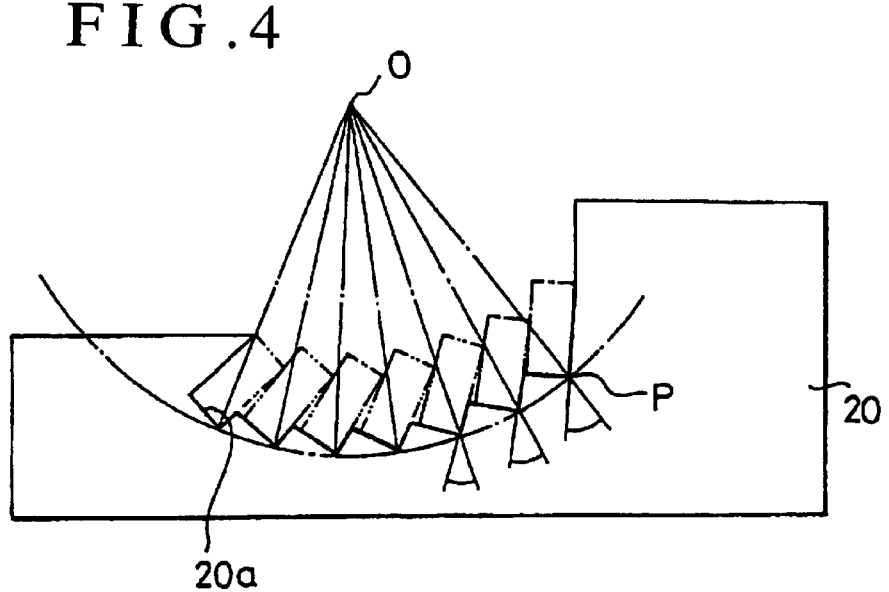
FIG. 4 is a plan view of a jig used for assembling permanent magnets.

More specifically, in FIG. 4, a plurality of radius lines R are drawn at an equal angle of circumference α from the center point O. On the radius line R, an outline, which is illustrated by a two-dots-and-a-line in FIG. 4, of the permanent magnet 12 of a rectangular section is drawn from the starting point P, which is away from the center point O by a predetermined distance so as to form a predetermined angle of inclination β relative to the radius line R. A jig 20, which has a recess 20a connecting the outlines, is prepared. The above-described permanent magnets 12 are put along the recess 20a of the jig 20, and the relative position of the plurality of permanent magnets 12 is fixed with glue or the like, and then the fixed permanent magnets 12 are attached to the disc of the rotors 4 and 5 via the sheets 13 or directly. Thus, the rotors 4 and 5 are produced. In this occasion, since there occurs a wedge type clearance, as illustrated in FIGS. 3 and 4, between the adjacent permanent magnets, it is preferred that a magnetic body is inserted into the clearance so that the magnets do not closely adhere to each other due to magnetism and that the magnetism is not weakened by means of the clearance. However, in this operation, the wedge type clearance should not be completely filled with the magnetic body. But it is preferred that only the tip of the wedge shape, i.e., the sharpened portion, is filled with the material while the bottom portion of the wedge shape is remained without being filled with the magnetic body so that at least the poles of S and N of each permanent magnets are exposed. Contrary to this, it is not preferred for the wedge shaped clearance to be completely filled with a magnetic body, since the adjacent permanent magnets become in one body.

Figure 5:
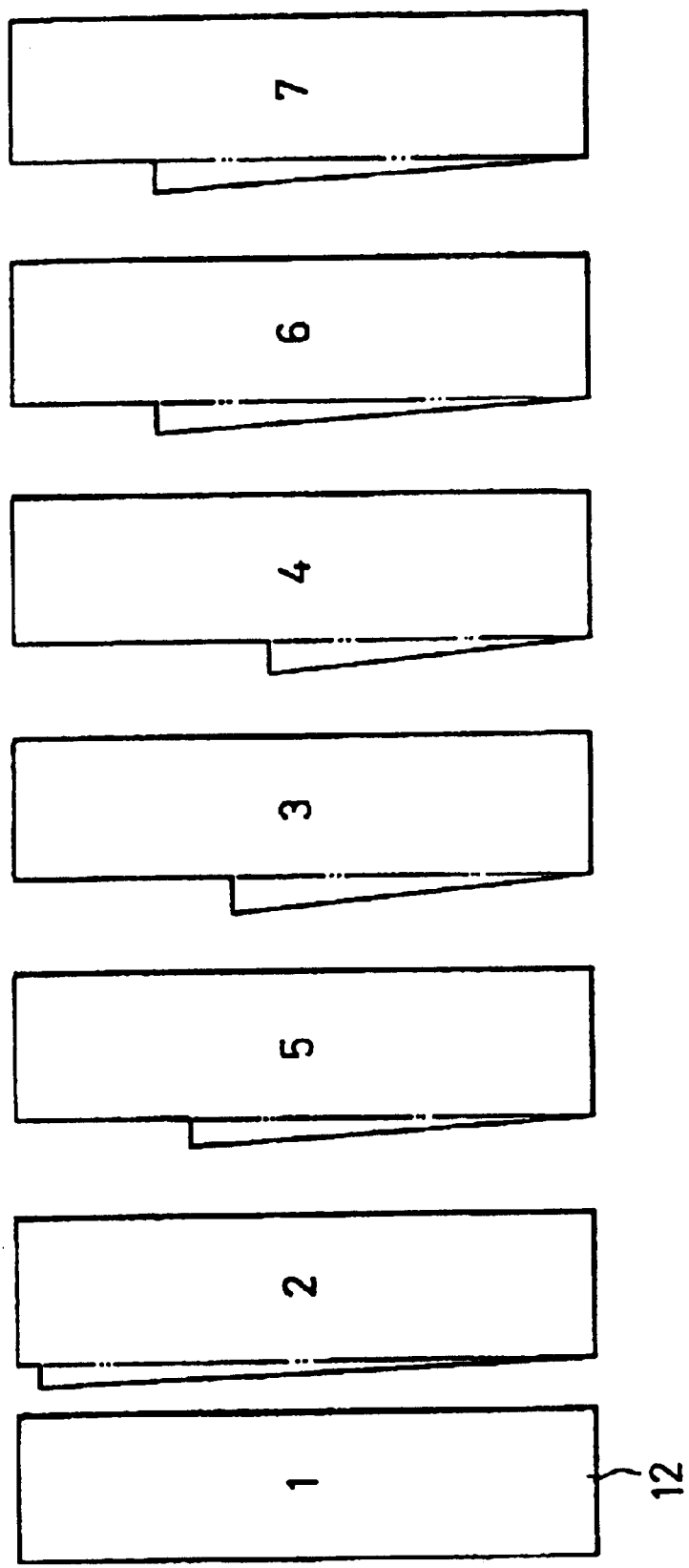
FIG. 5 is a view showing molded permanent magnets wherein the jig illustrated in FIG. 4 is not used.

FIG. 5 is a view showing molded permanent magnets wherein the jig illustrated in FIG. 4 is not used. As illustrated in FIG. 5, it is preferred that a plurality of permanent magnets 12 are a combination of a permanent magnet 12 with a rectangle section and permanent magnets 12 having a triangle-shaped stub and projecting from one side of the rectangular section as illustrated in FIG. 5.

When the permanent magnets are shaped as described above, a desired magnetizing operation can be done. When a plurality of permanent magnets 12 formed in a rectangular section are adjacently arranged, the permanent magnets 12 may magnetically adhere to each other at their sides in a coherence state, and a desired combination can be obtained easily. In this occasion, if a plurality of permanent magnets 12 provided with tirangle-shaped stubs which are different in their projections are used, the inclining angle β can be varied.

Figure 18:
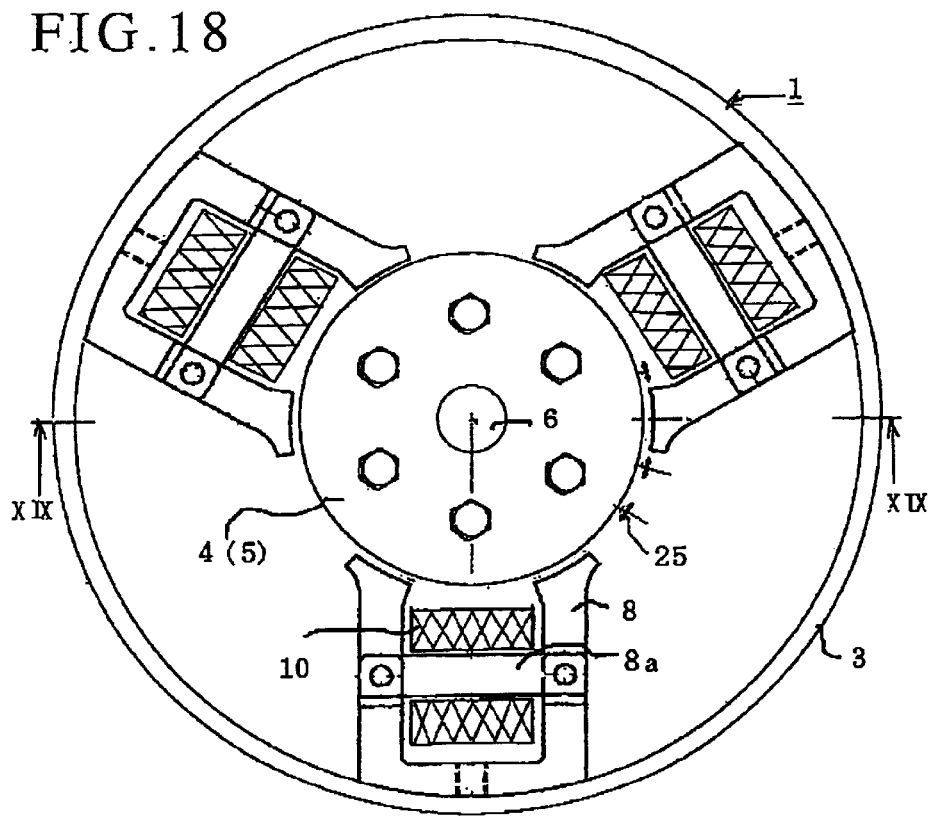
FIG. 18 is a plan view of an embodiment of a magnetic motor provided with rotor according to the present invention, wherein one side is removed.
Figure 19:
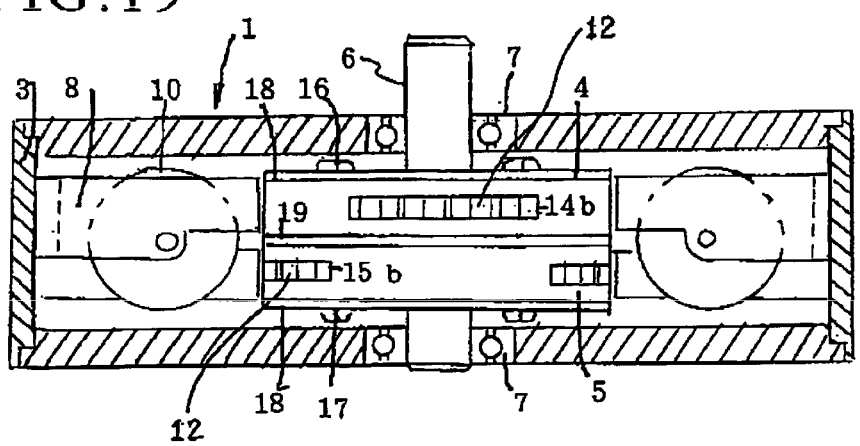
FIG. 19 is a cross sectional view along line XIX—XIX in FIG. 18. Rotors 4 and 5 and spindle 6 are not cross sectioned.
Figure 20:
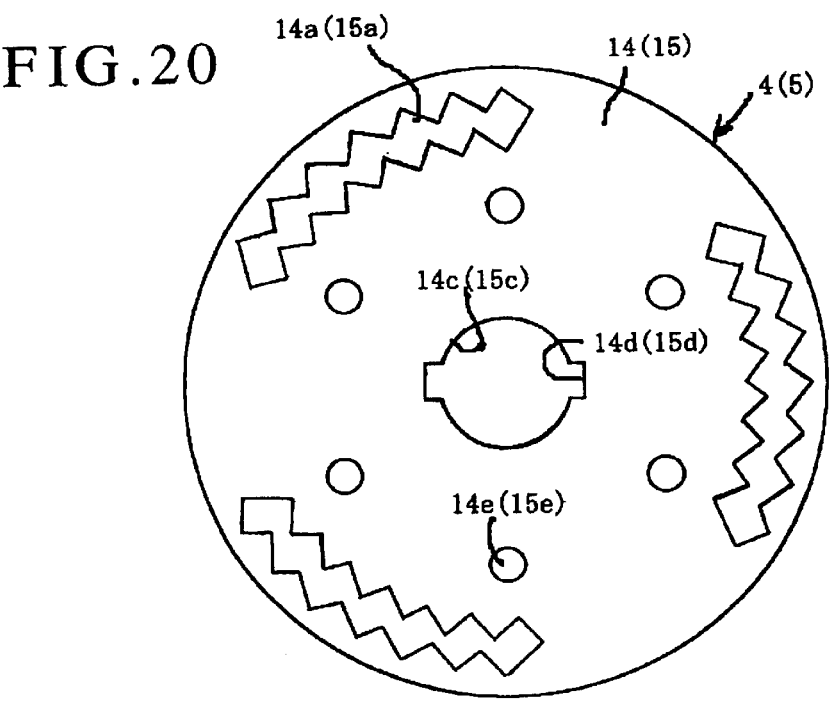
FIG. 20 is an enlarged plan view of an rotor body.
Figure 21:
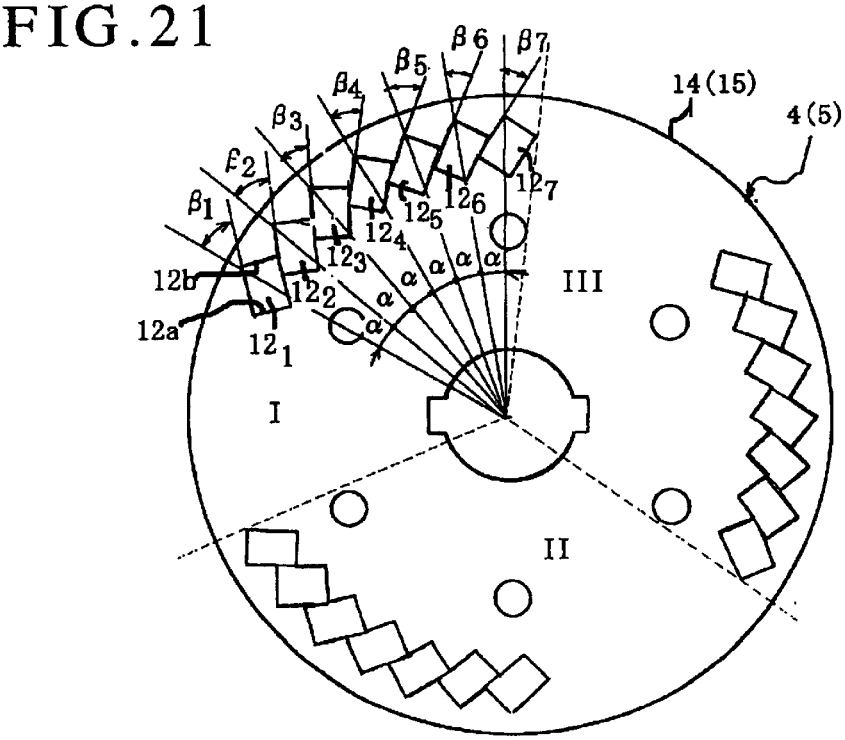
FIG. 21 is an enlarged plan view showing arrangement of permanent magnets on a rotor body.

Another embodiment of the present invention will now be explained. FIG. 18 is a plan view of an embodiment of a magnetic motor provided with rotor according to the present invention, wherein one side is removed. FIG. 19 is a cross sectional view along line XIX—XIX in FIG. 18. FIG. 20 is an enlarged plan view of an rotor body, and FIG. 21 is an enlarged plan view showing arrangement of permanent magnets on a rotor body.

As illustrated in FIGS. 18 and 19, a motor 1 is received in a cylindrical case 3 in this embodiment. Vertically overlaid rotors 4 and 5 are adjacent to each other and are mounted on a spindle 6 at a different phase of 60°. The spindle 6 is rotatably supported by a pair of bearings 7, and the vertically overlaid rotors can rotate together with the spindle 6.

Near periphery of each rotor 4 or 5, six, i.e., overlaid upper three and lower three, laminated iron cores 8 having a cross-section of ⊐ are disposed equidistantly about an axis of the spindle 6, i.e., at an interval of 120°. In the above-described embodiment, the iron cores 8 are so arranged that the vertical line of ⊐ shape is aligned in an axial direction, i.e., vertical direction, of the spindle 6. Contrary to this, in this embodiment, as illustrated in FIG. 18, the iron cores 8 are so arranged that the vertical line of ⊐ shape is aligned in circumferential direction, i.e., horizontal direction, of the spindle 6.

The center of side lines of each ⊐ shaped iron core 8 are connected to each other by means of a connecting bar 8a, and the electromagnetic coil 10 is inserted onto the connecting bar 8a.

Furthermore, a magnetic sensor 25 which detects phase of the rotors 4 and 5 by the permanent magnet 12 of the rotors 4 and 5 and which controls energization of the electromagnets is disposed in the case 3. The six electromagnetic coils 10 are so connected that their polarity in energization becomes the same and are connected to a direct current power supply so that DC voltage is applied by means of the sensor 25 and a current supply means at a predetermined timing as will be explained later.

As illustrated in FIG. 21, in the present invention, the rotor 4 and 5 comprise rotor bodies constructed by solid circular members 14 and 15 made of non-magnetic body, and a plurality of, seven in the illustrated embodiment, permanent magnets 12 accommodated in three recesses or holes 14a and 15a formed in the circular member and separated in the circumferential direction.

Since the rotor bodies have a circular cross section and are constructed by a solid circular members 14 and 15 having a certain thickness in the axial direction, they have sufficient strength and can surely hold the permanent magnets 12.

In order to obtain sufficient strength and to surely hold the permanent magnets 12, it is preferred that non-magnetic body constituting said circular member 14a and 15a of the rotor bodies 14 and 15 is made of carbon resin as a principal component.

The recesses or holes 14a and 15a formed in the circular members 14 and 15 are intended to accommodate a plurality of, seven in the embodiment illustrated in FIG. 21 as described above, permanent magnets 12. The recesses or holes 14a and 15a have a shape obtained by drawing the the outer peripheries of a plurality of permanent magnets, when they are seen in a plan view as illustrated in FIG. 20. The inner walls of the recesses or holes 14a and 15a engages with at least inner end 12a and outer end 12b of each permanent magnets 12 as illustrated in FIG. 21 so that they can hold the respective permanent magnets at predetermined positions.

The arrangement of permanent magnets 12 of the rotors 4 and 5 is illustrated in FIG. 21. The rotors 4 and 5 are equidistantly sectioned into a plurality of (three in FIG. 20) regions I, II and III in a circumferential direction. Each region I, II or III has portions wherein a plurality of permanent magnets 12 are adjacently disposed therein and portions wherein no permanent magnets 12 are disposed therein. In the embodiment illustrated in FIG. 20, seven permanent magnets 12, each having an approximately rectangular region, are disposed in each region I, II or III. The permanent magnets 12 are disposed inclining so as to form an inclination angle $\beta$, which is between 35° and 60° against a plurality of radial lines r, which extend outward from the axis of rotation of the spindle 6 forming an angle of circumference $\alpha$ therebetween.

The angle $\beta$ may be the same for all the permanent magnets, and alternatively, it may be slightly different for each permanent magnet 12 as illustrated in FIG. 21. In this embodiment, the recesses or holes 14 or 15 formed in the circular members 14 and 15 are so formed that a plurality of permanent magnets 12 are accommodated therein in a differently inclined condition, i.e., different angles $\beta_1$, $\beta_2$, $\beta_3$ . . .

The recesses or holes 14a and 15a formed in the circular members 14 and 15 extend in an axial direction of the rotor bodies, and either one of upper or lower side has bottom in case of a recess, or vertically penetrating in case of a hole. In this embodiment, the circular members 14 and 15 have holes 14a and 15a.

Further, in the circular members 14 and 15 in the present embodiment, the outsides of portions where a plurality of permanent magnets 12 are disposed are open 14b and 15b in a slender rectangle shape as illustrated in FIG. 19 when they are seen from the side.

The permanent magnets 12 used in the present invention are subjected to a magnetizing operation, after they are molded in a predetermined shape, i.e., a slender rectanglar shape in the illustrated embodiment. In this occasion, a desired magnetizing operation cannot be done when material to be the permanent magnet 12 is formed in a complicated shape. Therefor, the material to be made a permanent magnet 12 has to be molded in a relatively simple shape.

The assembling method of the rotor according to the present invention will now be explained. After the circular member 14 or 15 constituting the rotor body is laid horizontally, the first permanent magnet $12_1$ is inserted into the recess or hole 14a or 15a, and the inner side 12a and the outer side 12b of the first permanent magnet $12_1$ are engaged with the inner walls of the recess or hole 14a or 15a so that the first permanent magnet $12_1$ is held and secured to a predetermined position. Then, the second permanent magnet $12_2$ which will be located adjacent to the first permanent magnet $12_1$ is neared to the recess or hole 14a or 15a. Due to magnetic attraction of the permanent magnets $12_1$ and $12_2$ the second permanent magnet $12_2$ is attracted toward the first permanent magnet $12_1$ which has been held and secured to a predetermined position, and it is secured to a predetermined position. Doing the similar operation, a plurality of permanent magnets $12_1$, $12_2$, . . . are secured one by one to the respective predetermined positions in the recess or hole 14a or 15a.

In this embodiment, as illustrated in FIG. 19, the circular member forming the rotor bodies 14 and 15 have holes 14c and 15c formed at the center thereof, and the holes 14c and 15c have key grooves 14d and 15d formed at the inner wall thereof. Further, a plurality of (six in the illustrated embodiment) through holes 14e and 15e are formed for connecting a plurality of rotor bodies 14 and 15 by means of bolts.

As illustrated in FIG. 19, thin covers 18 and spacer 19, both made of non-magnetic body are disposed outside of and between the upper and lower rotors 4 and 5. The covers 18 and spacer 19 have holes for penetrating the bolts.

The cover 18, the lower rotor 5, the spacer 19, the upper rotor 4 and the cover 18 are mounted one by one on the spindle 6, and the key groove 15*d* formed in the hole 15*c* of one of the rotors, for example, rotor 5, is aligned with the key on the spindle 6, and after the upper and the phases of the lower rotors 4 and 5 are positioned forming a predetermined angle therebetween, both the covers 18, spacer 19 and the rotor bodies 14 and 15 are fastened to each other by means of the bolts and nuts so that the upper and lower rotors 4 and 5 are united as a whole.

Figure 11:
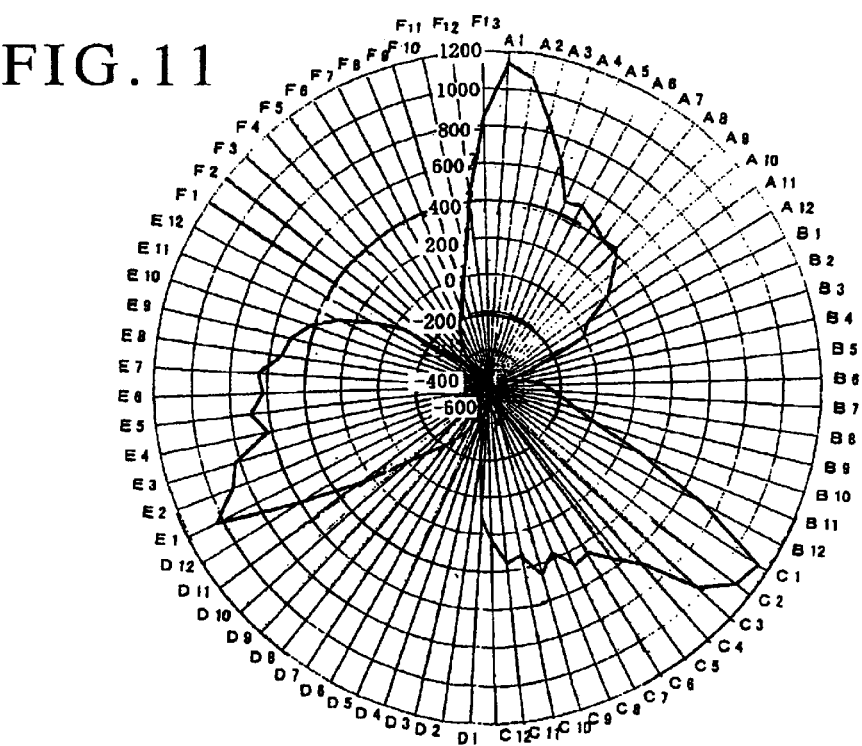
FIG. 11 is a graph showing magnetic distribution on the rotor in an embodiment wherein the arrangement of the permanent magnets is changed.

In the embodiments illustrated in FIGS. 3 and 11, a plurality of permanent magnets 12 disposed adjacently in a circumferential direction are disposed in such a manner that S pole and N pole are adjacent in a circumferential direction and that the S pole is directed outward. A plurality of permanent magnets 12 disposed adjacently in a circumferential direction may be disposed in such a manner that the N pole is directed outward. However, in this case, according to the change of arrangement of the permanent magnets 12, the construction of the magnetic sensor 25 and the electric current supply control means 30 is changed.

According to the present embodiment having the construction described above, since the rotors 4 and 5 are rotatably supported, before electric current is supplied with the electromagnetic coils 10 of the laminated iron cores 8, the rotors 4 and 5 stop in a condition wherein the permanent magnet (designated by 12 or 12' in FIG. 3) located at one end of a plurality of permanent magnets and the laminated iron cores 8 are facing to each other due to the magnetic action between the magnetic lines of force caused by a plurality of permanent, magnets 12 which are arranged in a special locational relationship and the rotatable rotors 4 and 5. Under this condition, when the electromagnetic coils 10 of the laminated iron cores 8 are supplied with electric current, the electromagnetic coils 10 and the permanent magnets 12 and 12' repulse or attract to each other, and the rotors 4 and 5 move.

In order to rotate the rotors 4 and 5 continuously, the phases, i.e, whether or not magnetism exists, of the rotors 4 and 5 are detected by the magnetic sensor 25, and direct voltage is applied to the electromagnetic coils 10 at a predetermine 3*d* timing through the current supply control means 30 based on the detected signal, and the rotors 4 and 5 rotate continuously when the direction of current flowing into the electromagnetic coils 10 is alternately changed.

In the present embodiment, the phases of the permanent magnets 12 of the rotors 4 and 5 are shifted and the two rotors 4 and 5 are overlaid, the rotation of the rotors 4 and 5 becomes smooth.

Figure 6:
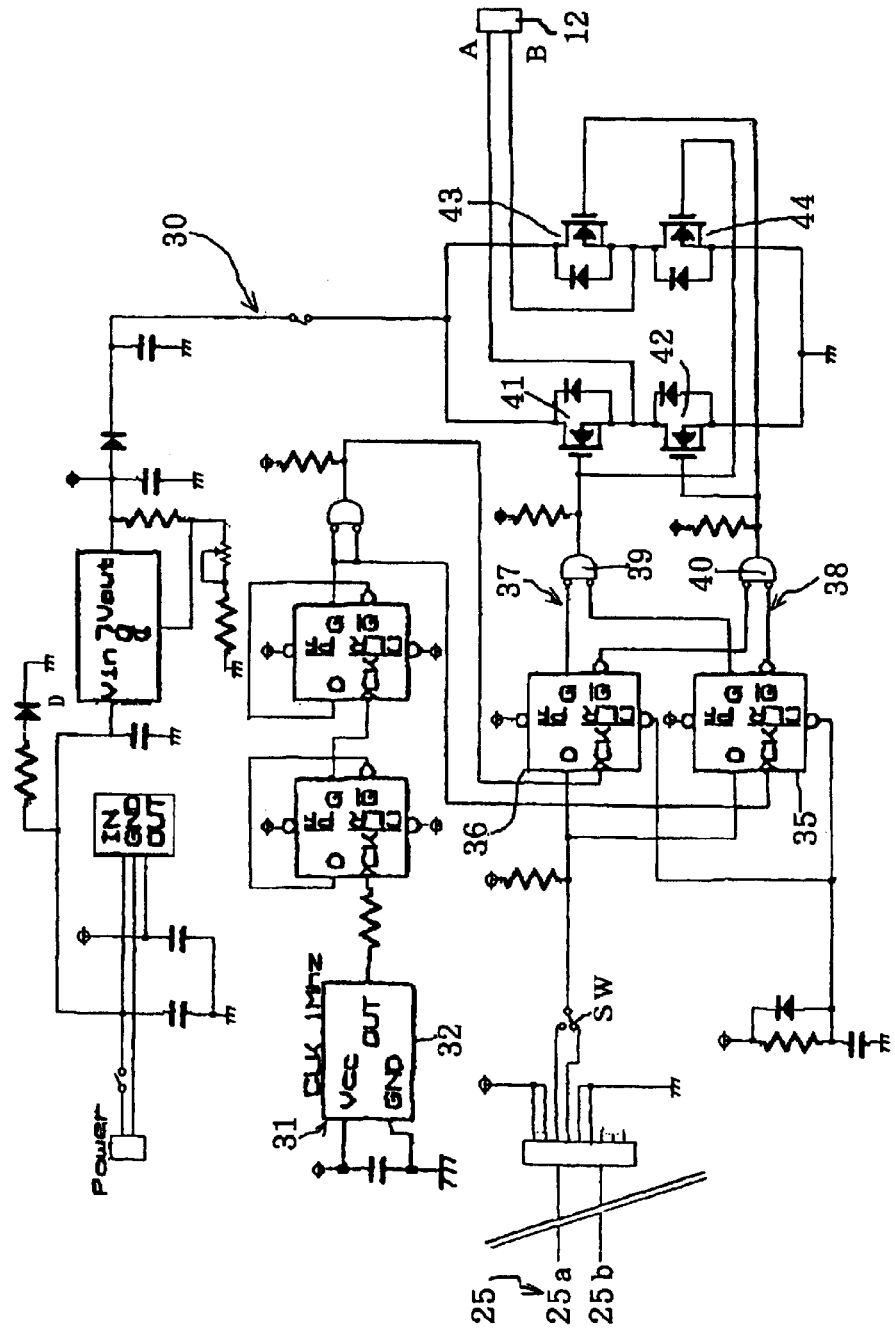
FIG. 6 is a circuit view of a current supply control means.
Figure 7:
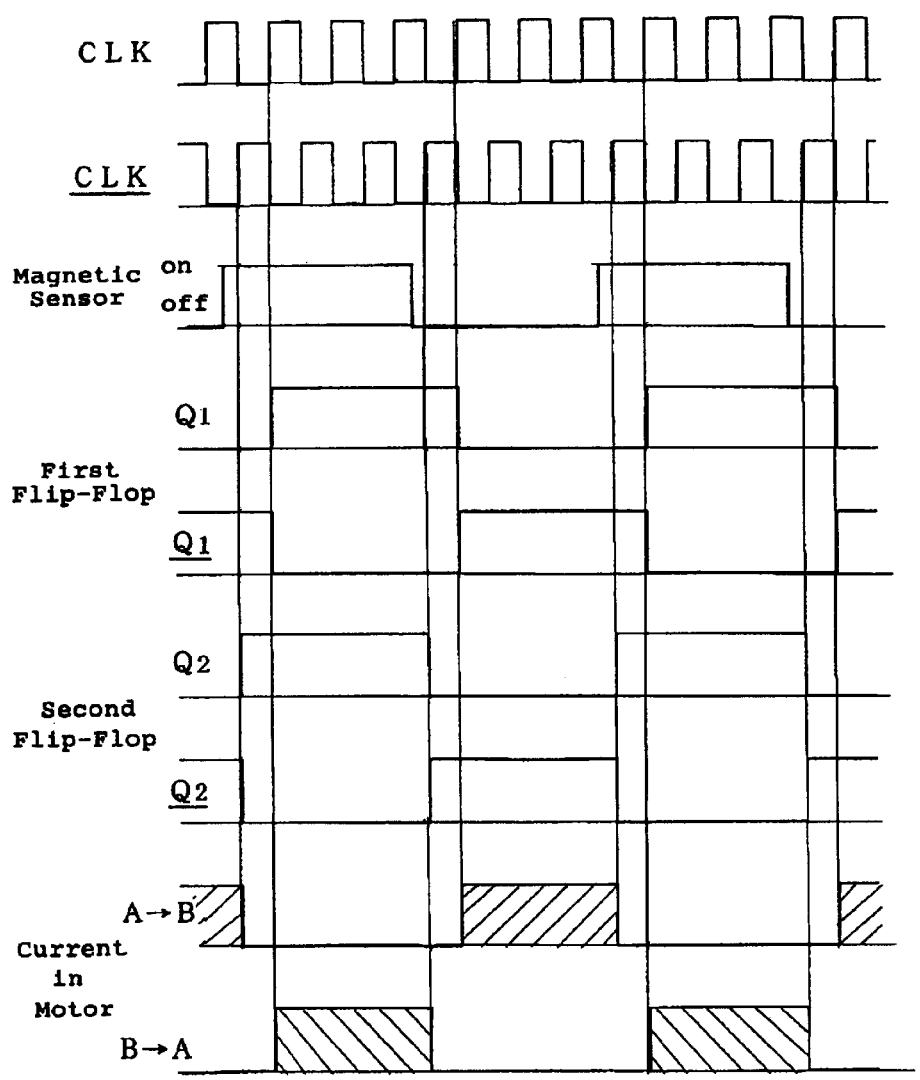
FIG. 7 is an operational chart showing operation according to the circuit of a current supply control means illustrated in FIG. 6.

Referring to FIGS. 6 and 7, an embodiment of the electric current supply means wherein the phases of the rotors 4 and 5 are detected by the magnetic sensor 25 and the supply of electric current to the electromagnetic coils 10 is controlled will now be explained. As described above, the magnetic sensor 25 is switched on/off in accordance with the magnetic strength of the S pole of the magnet, and in this embodiment, when S pole is not detected, on-signal MG is emitted while when S pole is detected, it is off. The switch SW is used to switch the magnetic sensor 25*a* and 25*b* so that the rotational direction of the rotor 4 and 5 is switched.

The electric current supply means 30 illustrated in FIG. 6 includes a clock pulse means 31 and a logic circuit connected to the clock pulse means 31 and the magnetic sensor 25.

The clock pulse means 31 is capable of emitting forward clock pulse CLK of a predetermined frequency and reverse clock pulse $\overline{\text{CLK}}$ obtained by reversing the same. In the present embodiment, pulses from a quartz oscillator 32 having oscillating frequency of 1 MHz are divided twice so as to obtain forward clock pulse CLK having period of 4 μsec, and then, it is reversed to obtain reverse clock pulse $\overline{\text{CLK}}$ (see FIG. 7).

The logic circuit includes two flip-flop means and tow NOR circuits, and comprises a first logic circuit 37 and a second logic circuit 38.

The flip-flop means is connected to the clock pulse means 31 and the magnetic sensor 25, and in this embodiment, it uses two D flip-flops as the first flip-flop means 35 and the second flip-flop means 36. The first flip-flop means is supplied with the signal MG from the magnetic sensor 25, and after receiving the clock pulse CLK from the clock pulse means 31, it emits forward output Q1 and reverse output $\overline{\text{Q2}}$. Contrary to this, the second flip-flop means 36 is supplied with the signal MG from the magnetic sensor 25, and after receiving the reverse clock pulse $\overline{\text{CLK}}$ from the clock pulse means 31, it emits forward output Q2 and reverse output $\overline{\text{Q2}}$ (see FIG. 7).

The first logic circuit 37 outputs at a predetermined timing based on the on-signals from the first flip-flop means 35 and the second flip-flop means 36 in accordance with the off-signal from the magnetic sensor 25. In the embodiment, the forward output Q1 of the first flip-flop means 35 and the forward output Q2 of the second flip-flop means 36 are reversed, i.e., outputting reverse outputs $\overline{\text{Q1}}$ and $\overline{\text{Q2}}$, and are input into the first NOR circuit 39. Thus, the output of the first NOR circuit is turned on by a forward clock pulse CLK after receiving off-signal $\overline{\text{MG}}$ from the magnetic sensor and is turned off by a reverse clock pulse $\overline{\text{CLK}}$ after receiving off-signal $\overline{\text{MG}}$ from the magnetic sensor. Contrary to this, reverse output $\overline{\text{Q1}}$ of the first flip-flop means 35 and reverse output $\overline{\text{Q2}}$ of the second flip-flop means 36 are reversed, i.e., forward outputs Q1 and Q2, and are input into the second NOR circuit 40. Thus, the output of the second NOR circuit 40 is turned on by a forward clock pulse CLK after receiving on-signal MG from the magnetic sensor 25 and is turned off by a reverse clock pulse $\overline{\text{CLK}}$ after receiving off-signal $\overline{\text{MG}}$ from the magnetic sensor (see FIG. 7).

A first field effect transistor (FET) 41 having a gate connected to the first logic circuit 37 and a second field effect transistor (FET) 42 having a gate connected to the second logic circuit 38 are connected in series. A third field effect transistor (FET) 43 having a gate connected to the second logic circuit 38 and a fourth field effect transistor (FET) 44 having a gate connected to the first logic circuit 37 are connected in series. The first field effect transistor 41 and the second field effect transistor (FET) 42 which are connected in series and the third field effect transistor (FET) 43 and the fourth field effect transistor (FET) 44 which are connected in series are connected in parallel between the power source and the power ground.

One terminal A of the electromagnetic coils 10 is connected between the first field effect transistor (FET) 41 and the second field effect transistor (FET) 42, and the other terminal B of the electromagnetic coils 10 is connected between the third field effect transistor (FET) 43 and the fourth field effect transistor (FET) 44.

Due to the above-described construction, the rotors under not energized condition are stopped between the adjacent two laminated iron cores 8 and 8, one of which has electromagnetic coil wound thereon and the other of which does not have electromagnetic coil wound thereon, due to the magnetic force depending on a plurality of permanent magnets 12 and laminated iron cores 8. The magnetic sensor 25 is disposed between the iron core having the electromagnetic coils wound thereon and the iron core having no electromagnetic coils wound thereon.

There are two cases wherein the magnetic sensor detects the magnetism and does not detect the magnetism depending on the stop position of the rotors, The case wherein the magnetic sensor detects the magnetism will now be explained.

The magnetic sensor 25 emits off-signal MG as described above when it detects the magnetism. The first flip-flop means 35 which has been input with the off-signal MG emits a forward output Q1 and a reverse output $\overline{Q1}$ after it receives clock pulse CLK from the clock pulse means 31. Contrary to this, the second flip-flop means 35 which has been input with the off-signal MG emits a forward output Q2 and a reverse output $\overline{Q2}$ after it receives reverse clock pulse $\overline{CLK}$ from the clock pulse means 31.

As described above, since the magnetic sensor 25 which has detected the S pole is emitting off-signal MG, the output of the first NOR circuit 39 is turned on upon receiving the forward clock pulse CLK after it receives the off-signal MG from the magnetic sensor 25, and the on-signal enters into the gate, and thus, the first field effect transistor (FET) 41 and the fourth field effect transistor (FET) 44 are energized. Thus, from the power source, electric current flows into the electromagnetic coils 10 through the first field effect transistor (FET) 41 and one of the terminals A of the electromagnetic coils 10, and the electric current flows into the power ground from the other terminal B of the electromagnetic coils 10 through the fourth field effect transistor (FET) 44 (see FIG. 7).

The electric power thus created and the permanent magnets 12 repulse to each other, and the rotors 4 and 5 rotate. When the magnetic sensor 25 does not detect the S pole, on-signal is emitted in place of off-signal which has been emitted. When the on-signal is emitted from the magnetic sensor 25, it is turned off upon reverse clock pulse $\overline{CLK}$ which is emitted after receiving the on-signal MG, the electric current to the power ground from the power source, through the first field effect transistor (FET) 41, the terminals A of the electromagnetic coils 10, the electromagnetic coils 10, the other terminal B of the electromagnetic coils 10, the fourth field effect transistor (FET) 44 is cut off. During this operation, the second field effect transistor (FET) 42 and the third field effect transistor (FET) 43 are in the off condition.

When on-signal is emitted from the magnetic sensor 25, the output of the second NOR circuit 40 is turned on upon receiving the forward clock pulse CLK after it receives the on-signal MG from the magnetic sensor 25 and is turned off upon receiving the reverse clock pulse $\overline{CLK}$ after it receives the next off-signal MG. Due to this, during this operation, electric current flows from the power source to the power ground, through the electromagnetic coils 10, one of the terminals A of the electromagnetic coils 10, and the second field effect transistor (FET) 42, while the first field effect transistor (FET) 41 and the fourth field effect transistor (FET) 44 are in an off-condition.

As described above, according to the present invention, since the electric current flowing direction to the electromagnetic coils 10 is changed by signal from the magnetic sensor 25 and clock pulse from the clock pulse generating means, simultaneous flowing of electric current to the first field effect transistor (FET) 41 and the fourth field effect transistor (FET) 44 is completely prevented from occurring.

In order to rotate the rotor in anti-clockwise direction, the switch SW is changed so that three magnetic sensors $25b_1$ and $25b_2$ are operated. When any one of these three magnet sensors $25b_1$ and $25b_2$ detects magnetism, the signal from the magnetic sensor becomes off-signal MG. Since only the current flowing timing is different from that in case of forward rotation due to the locational relationship of the sensors, their further explanation is omitted.

Figure 8:
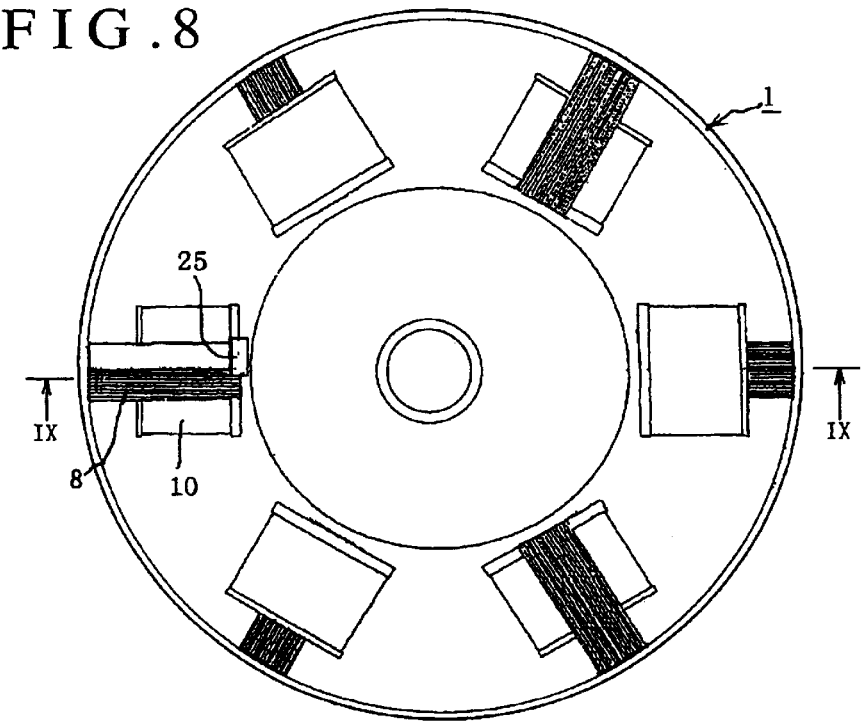
FIG. 8 is a plan view of a second embodiment of a motor according to the present invention, wherein one side is removed.
Figure 9:
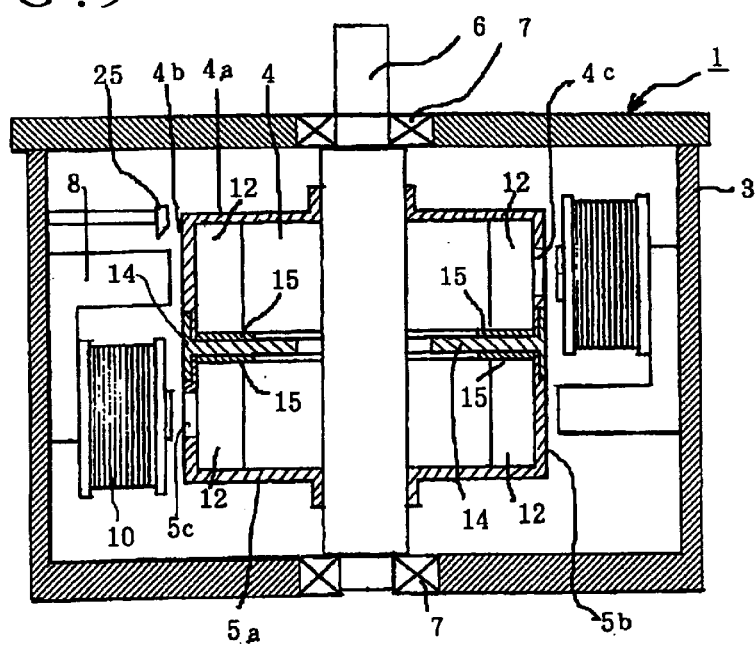
FIG. 9 is a cross sectional view along line IX—IX in FIG. 8.

FIG. 8 is a plan view of a second embodiment of a motor according to the present invention, wherein one side is removed; and FIG. 9 is a cross sectional view along line IX—IX in FIG. 8. In this second embodiment, the same members as those in the first embodiment illustrated in FIGS. 1, 2 and 3 are designated by the same reference numerals, and points different from the first embodiment will now be explained.

As illustrated in FIG. 9, similar to the first embodiment, the case of the two rotors 4 and 5 include discs 4a and 5a and circumferential plates 4b and 5b connected to the disc 4a and 5a, respectively, and is formed in a shallow cylinder shape. The two cylinders are overlaid and facing to each other having a spacer 14 therebetween. The spacer 14 is formed in a ring-like shape having a T-shape cross section as illustrated in FIG. 9. The outer surfaces of the free (lower) end of the circumferential plates 4b and the free (upper) end of the circumferential plates 5b are cut, respectively, and they are engaged with the inner side of the top of the T-shape of the spacer 14. Due to this construction, even when centrifugal force acts on the permanent magnets 12 and the circumferential plates 4b and 5b due to high speed, i.e., equal to or higher than 30,000 rpm, rotation of the rotors 4 and 5, the free ends of the circumferential plates 4b and 5b do not deform because they ate pressed from the outside by the T-shaped top of the spacer 14.

Similar to the first embodiment, the rotors 4 and 5 are equidistantly sectioned into three regions I, II and III in a circumferential direction. When it is seen from the above, as illustrated in FIG. 3, the permanent magnets 12 are disposed in such manner that S pole and N pole are adjacent to each other and S pole directs the outward. In this embodiment, in each region, seven permanent magnets 12 are so disposed that the inclination angles β formed relative to a plurality of radial lines r are gradually changed from 45° to 60° in a clockwise direction when it is seen from the above. If there is a clearance between the permanent magnets 12 mounted on the case and the spacer 14, the clearance is filled with packing so that they are surely secured.

The rotor 4 and the rotor 5 are mounted on the spindle 6 forming difference in their phases of 60°, and the circumferential plates 4b and 5b have opens 4c and 5c at the portion locating outsides of the permanent magnets 12 for about 60° in the angle at circumference.

In the second embodiment, the magnetic sensor 25 is turned on/off depending on the strength/weakness of the magnetic field caused by S pole of the magnets similar to the first embodiment and it is disposed so as to rotate the rotors 4 and 5 in a forward (clockwise) direction. As illustrated in FIGS. 8 and 9, the disposing location is slightly different from that in the first embodiment.

Figure 10:
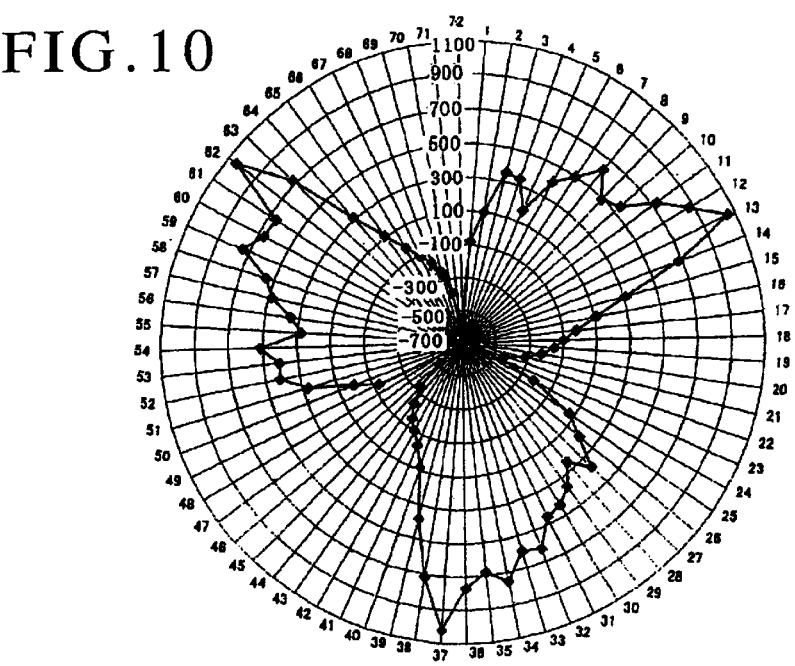
FIG. 10 is a graph showing magnetic distribution on the rotor of the second embodiment.

The distribution of magnetism in each region, wherein seven permanent magnets 12 are so disposed that the inclination angles β are gradually changed from 45° to 60° in a clockwise direction when it is seen from the above as described above, was investigated using a magnetic tester manufactured by Kabushiki Kaisha KANETEC after removing the rotor from the case 3 of the motor. At a position 1 mm away from the outer surface of the rotor 4, the magnetism at the center in a vertical direction, i.e., the portion where the opening 4c was formed was measured for several times, and the mean values are illustrated in FIG. 10. In FIG. 10, S poles are designated by + and N poles are designated by –, and the unit is gauss. The numerals 1–72 described at the outer surface designates the positions where measurements were done. The measurements were done at every 5°. There were openings 4c at positions corresponding to reference numerals 1–13, 25–37 and 49–61 where the permanent magnets 12 were disposed. The diameter of the rotor was 68 mm, the thickness of the case of the rotor was 1.5 mm, and the permanent magnet 12 had a height of 12.5 mm, a width of 8.5 mm, a thickness in the magnetizing direction of 4 mm, and 1120 gauss.

Since the inclination angles β of the permanent magnets 12 were gradually changed, as illustrated in FIG. 10, the magnetism was gradually increased in a clockwise direction where the magnets were disposed, and there appeared N poles at portions just before the right ends of the aligned magnets, and thus as a whole, distribution of magnetism like a petal was obtained.

When magnetism on the rotor 5 was measured, similar petal shape distribution of magnetism was obtained, but the distribution of magnets so appeared that they shifted by 60° because the rotors 4 and 5 are shifted by 60° relative to the spindle 6.

FIG. 11 is a graph showing magnetic distribution on the rotor in an embodiment wherein the arrangement of the permanent magnets is changed. In this embodiment, seven permanent magnets are disposed in each of three regions similar to that described above, however, their inclinations against radial lines extending outward from the rotational center are opposite to those illustrated in FIG. 3. Accordingly, different from the above-described embodiment, the inclination angles β formed relative to radial lines r are gradually changed from 45° to 60° in an anti-clockwise direction when it is seen from the above. In addition, they are so disposed that the N poles direct outward. The construction is benefit for rotating the rotor in an anti-clockwise direction.

The magnets used had a height of 20 mm, a width of 7.6 mm, a thickness in the magnetizing direction of 3 mm, and 2300 gauss. The measuring position by the magnetic tester was 1 mm away from the outer surface of the rotor 4, and above the rotor 4 in a vertical direction, i.e., above the opening. The thickness of the case of the rotor was 1.5 mm.

In FIG. 11, N poles are designated by + and S poles are designated by –, and the unit is gauss. The permanent magnets are disposed at positions corresponding to reference numerals A1–A12, C1–C12 and E1–E12. Taking the number of gauss of the used magnets into consideration, magnetism measured in FIG. 11 seems to be less than that in FIG. 10. The inventor considers that this phenomena was caused by measurement of magnetism via the case of the rotor.

Also in FIG. 11, the magnetism was gradually increased in an anti-clockwise direction where the magnets were disposed, and there appeared S poles at portions just before the left ends of the aligned magnets, and thus as a whole, distribution of magnetism like a petal was obtained similarly to FIG. 10.

Figure 12:
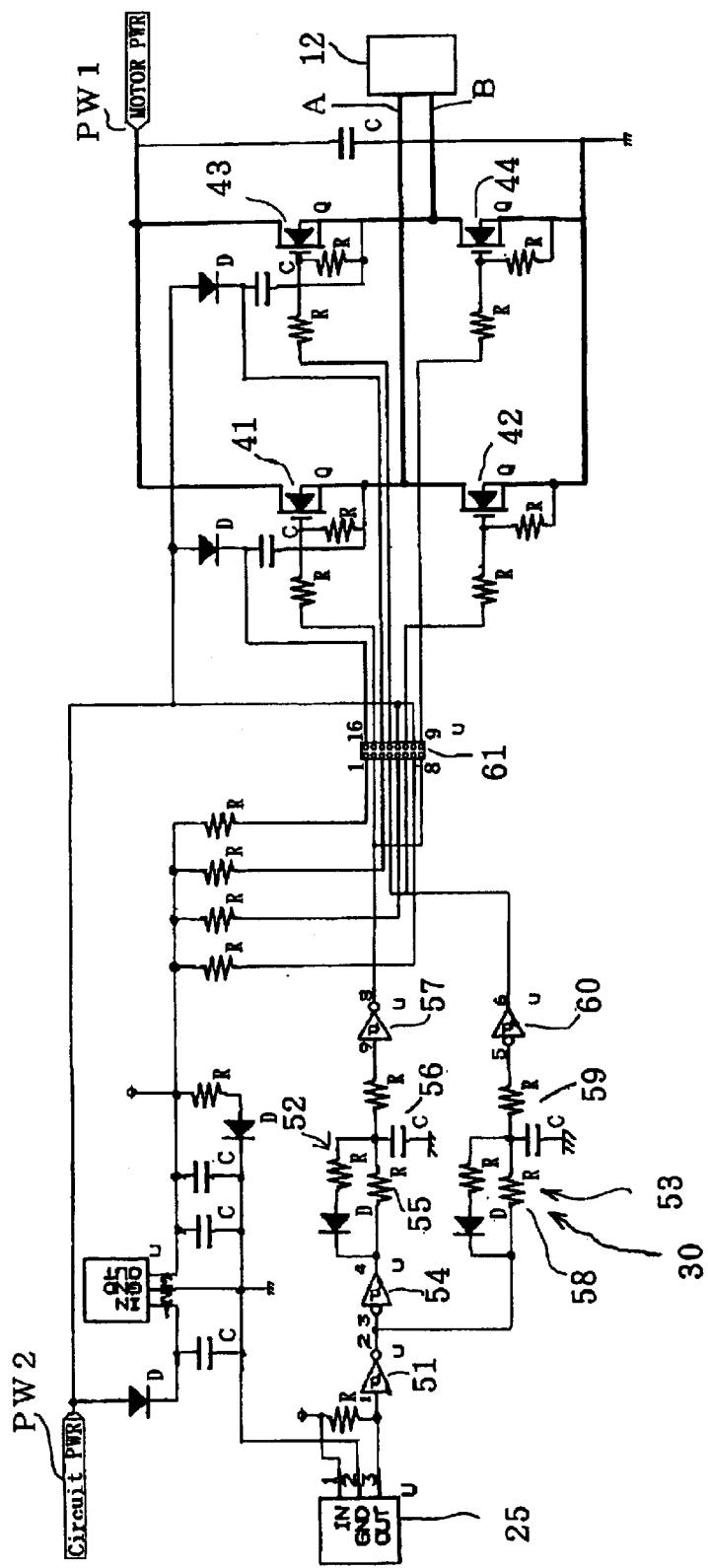
FIG. 12 is a circuit view of a current supply control means used for the second embodiment.
Figure 13:
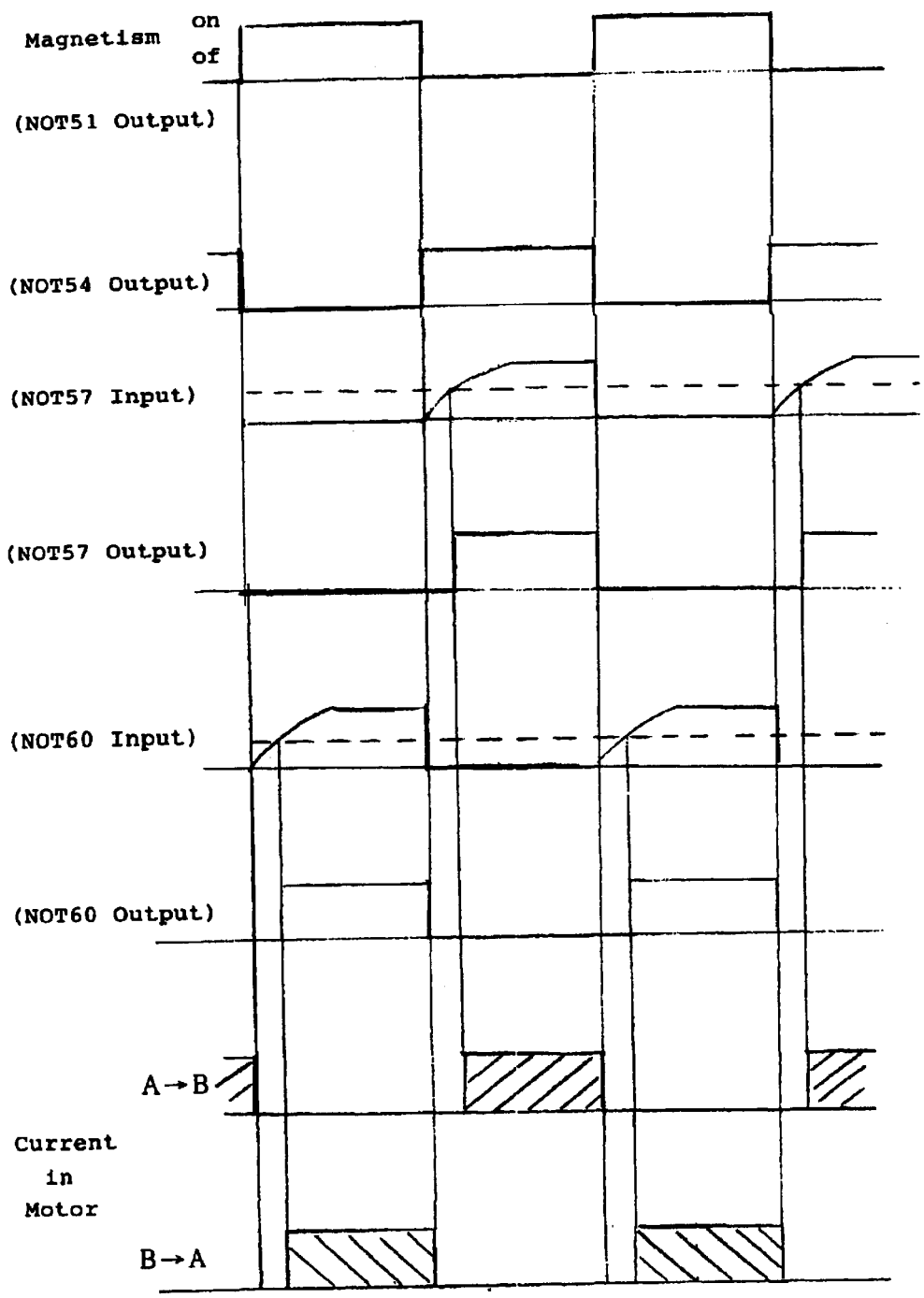
FIG. 13 is an operational chart showing operation according to the circuit of a current supply control means illustrated in FIG. 12.

FIG. 12 is a circuit view of another embodiment of a current supply control means used for the second embodiment, and FIG. 13 is an operational chart showing operation according to the circuit of a current supply control means illustrated in FIG. 12. The current supply control means may also be applied to the embodiment explained with reference to FIGS. 8 and 9.

In this embodiment, similar to the above-described first embodiment, the magnetic sensor 25 is switched on/off in accordance with the strength of the S pole of the magnet, and in this embodiment, when S pole is not detected, on-signal is emitted from a NOT circuit 51 while when S pole is detected, it is off.

The NOT circuit 51 is connected to the current supply control means 30, and in this embodiment, the current supply control means 30 includes two delay circuits 52 and 53, which are connected to the NOT circuit, respectively. The first delay circuit 52 includes a NOT circuit 54, resistance 55, capacitor 56 and a NOT circuit 57. The second delay circuit 53 includes resistance 58, capacitor 59 and a NOT circuit 60.

As illustrated in FIG. 13, the signal from the NOT circuit 51 is, in the first delay circuit 52, reversed at the NOT circuit 54, and rises with some delay due to the resistance 55 and the capacitor 56, and emits a signal at the NOT circuit 57 in accordance with the set threshhold level. Thus, the signal from the NOT circuit 57 is output having some delay relative to the on/off timing of the signal from the magnetic sensor 25.

Contrary to this, as illustrated in FIG. 13, the signal from the NOT circuit 51 is input into the first delay circuit 52 as it is, and rises with some delay due to the resistance 55 and the capacitor 56, and emits a signal in accordance with the threshhold level set by the NOT circuit 60. The signal from the NOT circuit 60 is output having some delay relative to the on/off timing of the signal from the magnetic sensor 25.

The output signals from the NOT circuit 57 and the NOT circuit 60 are input to the input terminal of the phtocoupler, respectively.

In FIG. 12, the circuit relating to the driving of the motor 1 is designated by a thick line, and relative to the power source PW1, the first transistor 41 and the second transistor 42 are connected in series, a third transitor 43 and a fourth transistor 44 are connected in series. The first and second transistors 41 and 42 connected in series and the third and fourth transistors 43 and 44 connected in series are connected in parallel. One A of terminals of the electromagnetic coils 10 is connected between the first and second transistors 41 and 42, the other terminal A of the electro-magnetic coils 10 is connected between the third and fourth transistors 43 and 44. A gate or base of each transistor is connected to the current supply control means. More specifically, via the phtocoupler 61, the signal from the first delay circuit 52 (NOT circuit 57) is transmitted to the agates or bases of the first transitor 41 and the fourth transitor 44, and the signal from the second delay circuit 53 (NOT circuit 60) is transmitted to the agates or bases of the second transitor 42 and the third transitor 43.

The transistors 41–44 may be a bipolar transistor. However, field effect transistor is more preferable for high rotational speed motor, for example, of equal to or higher than 30,000 rpm, since its switching speed is high. Further it is preferable because its logic is easy due to its voltage control type. In the embodiment illustrated in FIG. 12, all the transistors 41–44 are transistor, and the signals from the delay circuits 52 and 53 are input into the gates of the transistors.

In FIG. 12, the driving system is designated by a thick line, while the control system is designated by a thin line.

The power source PW1 for the driving system and the power source PW2 for the control system are separated. Due to this construction, even when the rotational speed of the motor is changed, in other words, even when the electric voltage is changed, the control can be stable done without adversely effecting the control system.

In the above described construction, when the magnetic sensor detects the magnetism, as described above, an off-signal is emitted from the NOT circuit 51, then it becomes an on-signal at the the NOT circuit in the first delay circuit 52 after it is reversed, and it rises with delay due to the resistance 55 and the capacitor 56, and thus, as illustrated in FIG. 13, the on-signal is output from the NOT circuit 57 having a predetermined delay time after the signal is emitted from the magnetic sensor 25. In this case, in the second delay circuit, off-signal remains. Accordingly, from the photocoupler 61, the on-signal from the first delay circuit 52 is input into the gates of the first field effect transitor 41 and the fourth field effect transitor 44, and both the first field effect transitor 41 and the fourth field effect transitor 44 are energized, As a result, electric current flows from the power source PW1 to the electromagnetic coils 10 through the first field effect transitor 41 and one terminal A of the electromagnetic coils 10, and it flows from the other terminal B of the electromagnetic coils 10 to the power ground through the fourth field effect transitor 44 (see FIG. 12).

The electric power thus created and the permanent magnets 12 repulse to each other, and the rotors 4 and 5 rotate. When the magnetic sensor 25 does not detect the S pole, on-signal is emitted from the NOT circuit in place of off-signal which has been emitted. When the on-signal is emitted from the NOT circuit as illustrated in FIG. 13, it becomes in an off-condition in the delay circuit 52 since it is reversed in the NOT circuit 54, while its rising is delayed due to the resistance 58 and the capacitor 59 in the delay circuit 53, and as a result, from the NOT circuit 60, an on-signal is output after a predetermined delay time from the signal of the magnetic sensor 25. Accordingly, from the photocoupler 61, the on-signal from the second delay circuit 53 is input into the gates of the third field effect transitor 43 and the second field effect transitor 42, and both the third field effect transitor 43 and the second field effect transitor 42 are energized, As a result, electric current flows from the power source PW1 to the electromagnetic coils 10 through the third field effect transitor 43 and one terminal B of the electromagnetic coils 10, and it flows from the other terminal A of the electromagnetic coils 10 to the power ground through the second field effect transitor 42 (see FIG. 12).

Also in this embodiment, since the electric current flowing direction to the electromagnetic coils is changed by signal from the magnetic sensor and electric current is flown into the electromagnetic coils after a predetermined time from detection of magnetism by means of the magnetic sensor, simultaneous flowing of electric current in both the directions in the motor is completely prevented from occurring.

Figure 14:
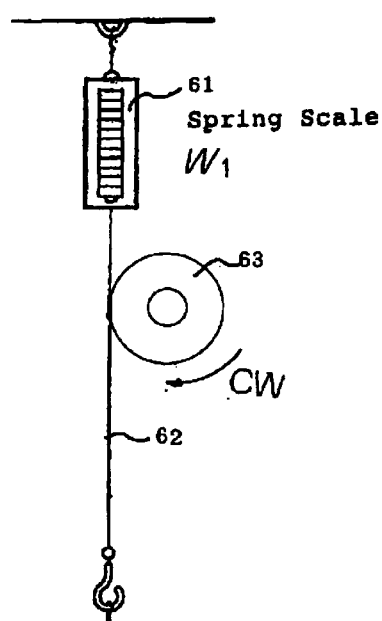
FIG. 14 is an explanatory view for explaining method of loading examination.

The load test of the embodiment illustrated in FIGS. 8 and 9 was done in accordance with FIG. 14. More specifically, after an end of a thread, i.e., a dial rope, 62 is attached to a spring scale, it is wound around a pulley 63 having a diameter of 1.0 cm and mounted on the spindle of the motor 1, and a weight 64 is attached to the other end of the hung down thread 62. The amount W2 of the weight 64 is variously changed, and input voltage, input electric current and rotational speed are measured while the motor is rotated 85. Measurement was repeated three times.

The torque was calculated in accordance with the following equation, wherein l designates the radius of the pulley 63.

$T(gf \cdot cm) = l(cm) \cdot (W2 - W1)(gf)$

Figure 17:
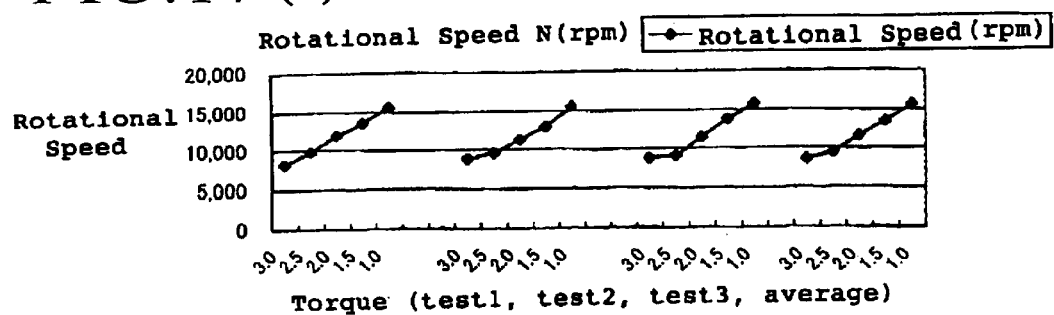
FIG. 17 are graphs showing the results described in Table 1; wherein (a) shows torque—rotational speed; and (b) shows torque—efficiency.
Figure 17:
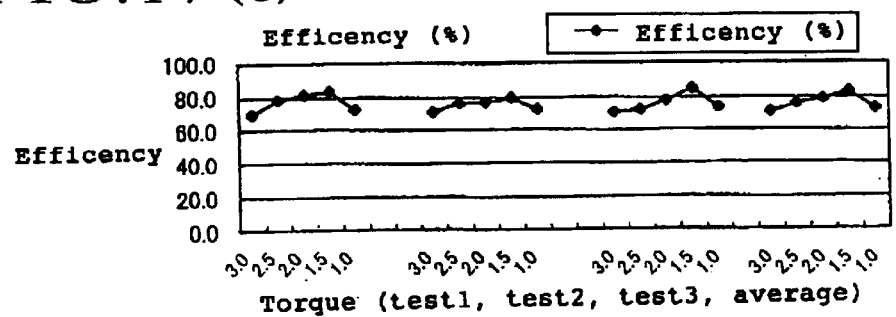

The measured results and the calculated results are shown in Table 1 and FIG. 17.

TABLE 1

| Input Voltage (V) | Torque (kgf · cm) | Input Current (A) | Rotational Speed (rpm) | Input Power (w) | Output Power (w) | Efficiency (%) |
|---|---|---|---|---|---|---|
| test 1 | | | | | | |
| 100.0 | 3.0 | 3.6 | 8,215 | 360.0 | 252.9 | 70.2 |
| 100.0 | 2.5 | 3.2 | 9,820 | 320.0 | 251.9 | 78.7 |
| 100.0 | 2.0 | 3.0 | 11,962 | 300.0 | 245.5 | 81.8 |
| 100.0 | 1.5 | 2.5 | 13,624 | 250.0 | 209.7 | 83.9 |
| 100.0 | 1.0 | 2.2 | 15,653 | 220.0 | 160.6 | 73.0 |
| test 2 | | | | | | |
| 100.0 | 3.0 | 3.8 | 8,810 | 380.0 | 271.2 | 71.4 |
| 100.0 | 2.5 | 3.2 | 9,540 | 320.0 | 244.7 | 76.5 |
| 100.0 | 2.0 | 3.0 | 11,290 | 300.0 | 231.7 | 77.2 |
| 100.0 | 1.5 | 2.5 | 12,950 | 250.0 | 199.3 | 79.7 |
| 100.0 | 1.0 | 2.2 | 15,617 | 220.0 | 160.2 | 72.8 |
| test 3 | | | | | | |
| 100.0 | 3.0 | 3.8 | 8,750 | 380.0 | 269.3 | 70.9 |
| 100.0 | 2.5 | 3.2 | 9,050 | 320.0 | 232.1 | 72.5 |
| 100.0 | 2.0 | 3.0 | 11,350 | 300.0 | 232.9 | 77.6 |
| 100.0 | 1.5 | 2.5 | 13,770 | 250.0 | 211.9 | 84.8 |
| 100.0 | 1.0 | 2.2 | 15,790 | 220.0 | 162.0 | 73.6 |
| average | | | | | | |
| 100.0 | 3.0 | 3.7 | 8,592 | 373.3 | 264.5 | 70.8 |
| 100.0 | 2.5 | 3.2 | 9,470 | 320.0 | 242.9 | 75.9 |
| 100.0 | 2.0 | 3.0 | 11,534 | 300.0 | 236.7 | 78.9 |
| 100.0 | 1.5 | 2.5 | 13,448 | 250.0 | 207.0 | 82.8 |
| 100.0 | 1.0 | 2.2 | 15,687 | 220.0 | 161.0 | 73.2 |

Figure 15:
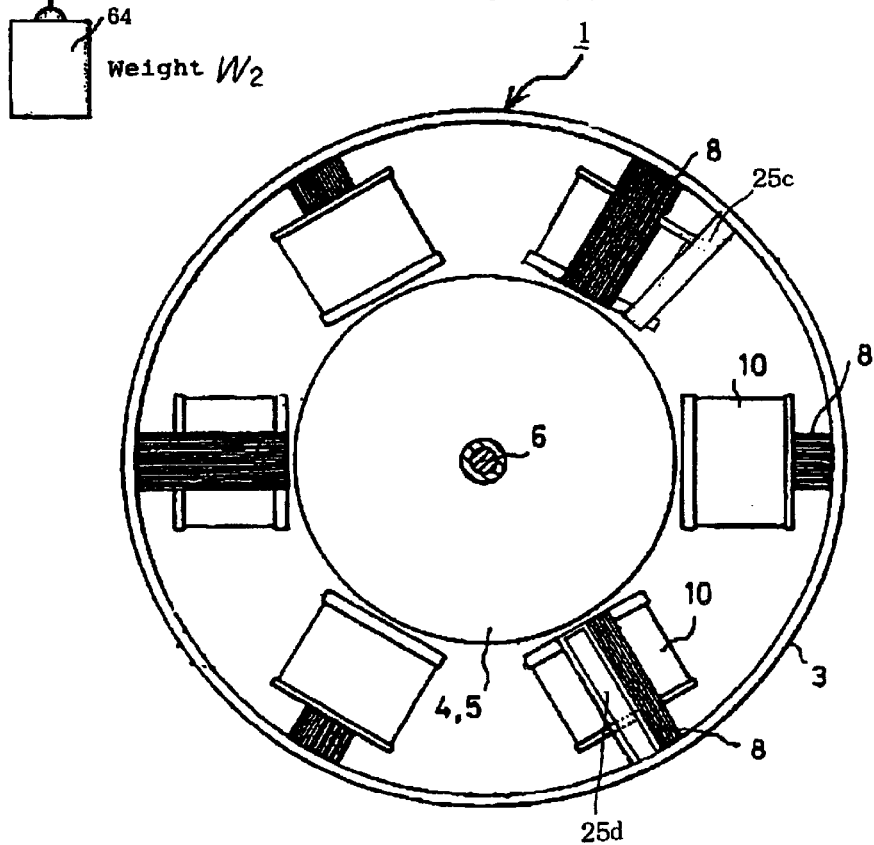
FIG. 15 is a plan view of a third embodiment of a motor according to the present invention, wherein one side is removed.
Figure 16:
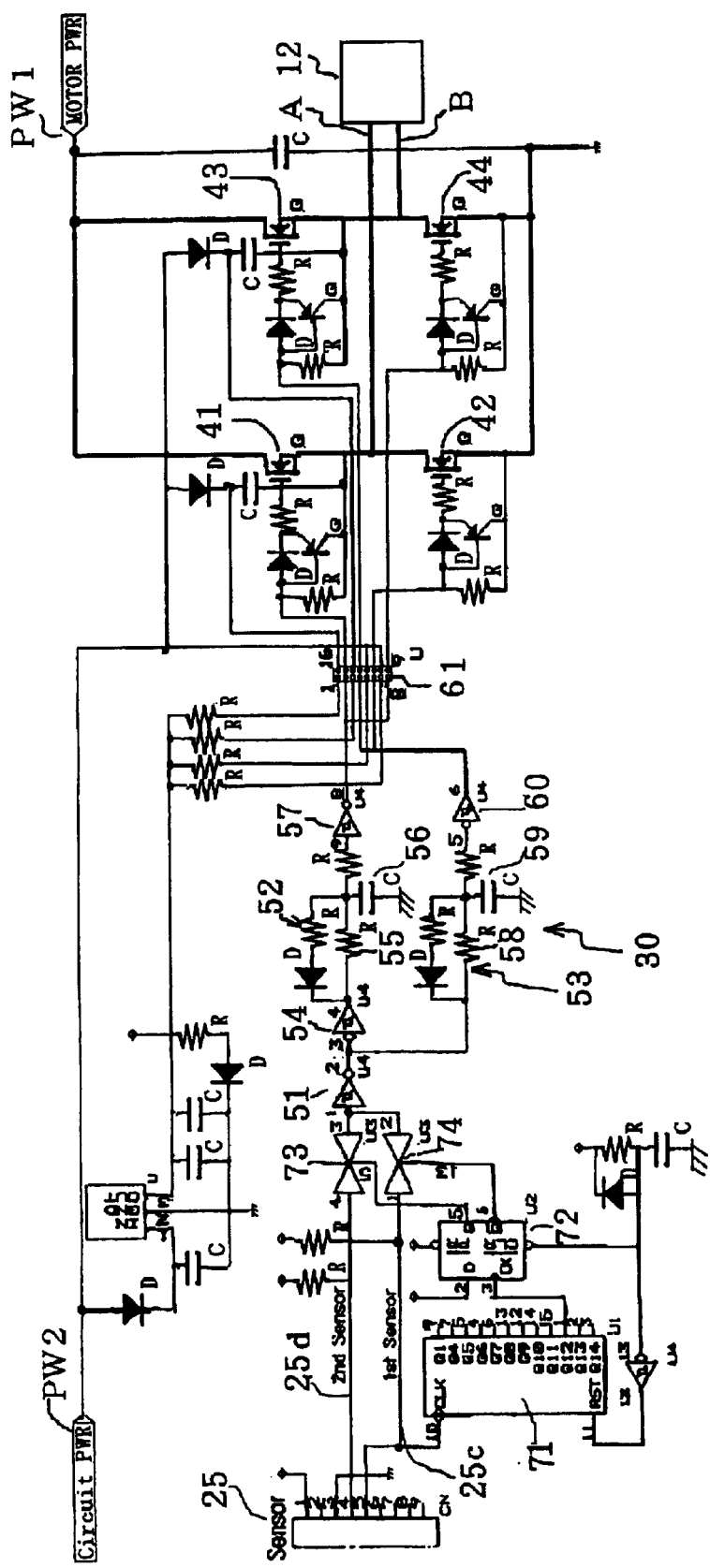
FIG. 16 is a circuit view of a current supply control means used for the third embodiment.

FIG. 15 is a plan view of a further embodiment of a motor according to the present invention, which plan view is similar to that of FIG. 1, and FIG. 16 is a circuit view of a current supply control means used for the third embodiment.

The embodiment illustrated in FIG. 15 is different from that illustrated in FIGS. 8 and 9 in that two magnetic sensors are disposed. One 25c of the two magnetic sensors is disposed at a height corresponding to the upper rotor 4 and at the side of the laminated iron cores 8. The other magnetic sensor 25d is disposed at the height the same as that of the magnetic sensor illustrated in FIG. 25. The magnetic sensor 25c operates upon start, and the magnetic sensor 25d operates during the normal operation.

The circuit view illustrated in FIG. 16 is almost the same as that of illustrated in FIG. 12, but it is different from the latter in that it has a circuit for switching the operation of the two magnetic sensors 25c and 25d. More specifically, signal from the magnetic sensors 25c and 25d is input into an analog switches 73 and 74 and at the same time it is transmitted to the pulse counter 71. The output of the pulse counter 71 is input into the flip-flop circuit 72, and the out put from the flip-flop circuit 72 is input into the analog switches 73 and 74, respectively. The outputs from the analog switches 73 and 74 is input into the NOT circuit 51. The signal from the NOT circuit is transmitted to the gates of the transistors 41–44 so that supply of electric current is controlled in a manner similar to that explained with FIG. 12.

Due to the construction, in this embodiment, the signal from the magnetic sensor 25c is input into the NOT circuit 51 from start until a predetermined number of pulses are counted in the pulse counter 71, and thereafter, the signal from the magnetic sensor 25d is input into the NOT circuit 51. The magnetic sensor 25 may operate until a predetermined time lapses or until the rotational speed of the rotor reaches at a predetermined value in place of counting the pulses from the magnetic sensor.

As described above, in this embodiment, different magnetic sensors detect upon start and during normal operation, the starting operation of the motor can be smooth, and further, it can be applied for high speed rotation higher than 30,000 rpm because the sensor 25d is disposed at such a position for forward rotation, i.e., rotation in a clockwise direction, that it detects magnetism during normal operation than upon starting.

In the illustrated embodiment, two rotors are mounted on the spindle, and according to the present invention, one or at least three rotors may be mounted on the spindle.

According to the present invention, magnetic motors which meet with the object and use can be obtained changing the characteristics of the permanent magnets, i.e., the magnetic strength, and size of the rotor and so on.

INDUSTRIAL APPLICABILITY

According to the present invention, the electric current supply direction is changed based on the signal from the magnetic sensor, and electric current is supplied with the electromagnetic coils after a predetermined time lapses from the detection of magnetism by the magnetic sensor. Accordingly, electric current is prevented from flowing in the same directions at the same time, and there occurs no electric current which does not contribute on the rotation of the motor by flowing from the power source to the power ground and not flowing through the motor.

Therefore, according to the present invention, no pass through electric current occurs, high torque can be achieved, and a magnetic motor with stable rotation and high efficiency can be obtained.

Further, when the operational conditions are the same for the rotation in a clockwise direction (forward rotation—cw) and that in a anti-clockwise direction (backward rotation—ccw), almost the same efficiencies can be obtained.

In the rotor proposed by the present invention, it comprises rotor body comprising a solid circular member made of non-magnetic body.

In the present invention, the rotor comprises: the rotor body constructed by a solid circular member made of non-magnetic body; and a plurality of permanent magnets accommodated in the recesses or holes formed in the circular member.

Due to this construction, upon assembly, one of the plurality of permanent magnets is accommodated in the recess or hole formed in the rotor body, and while the permanent magnet is accommodated in the recess or hole, the next permanent magnet is installed into the recesses or holes, the next magnet is guided into the recesses or holes due to the magnetic force of both the magnets and is secured to a predetermined position in the recesses or holes. Repeating the similar operation, a plurality of permanent magnets are installed into the recesses or holes one by one. Thus, without requiring special skill, all the magnets are installed into the predetermined positions in the recesses or holes, and accordingly, production efficiency upon assembly is highly enhanced.

Further, in the present invention, the rotor body is constructed by a solid circular member made of non-magnetic body, and a plurality of permanent magnets are accommodated in the recesses or holes formed in the circular member. Due to this construction, even if centrifugal force is acted on the permanent magnet during a high speed rotation, the rotor body is not deformed nor damaged, and the permanent magnets are surely held, and accordingly, the magnetic motor can rotate at a high speed.

What is claimed is:

1. A magnetic motor comprises a rotor having permanent magnets and rotatably disposed about an axis of rotation, a magnetic sensor disposed at a periphery of the rotor, a plurality of electro-magnetic coils, and control means which controls electric current to the electro-magnetic coils based on detection of magnetism from the permanent magnets by means of the magnetic sensor, the rotor being equidistantly divided in a circumferential direction into a plurality of regions, each region comprising a portion wherein a plurality of permanent magnets are disposed and a portion wherein no permanent magnets are disposed, each permanent magnet being disposed inclined against a radial line extending outwardly from the rotating axis, the rotor is a solid circular member made of non-magnetic body, said circular member has recesses or holes formed therein for accommodating therein said plurality of permanent magnets inclined against radial lines, said plurality of permanent magnets are accommodated in said recesses or holes, and the portion of the rotor where the plurality of magnets is disposed opens radially outward.

2. A magnetic motor according to claim 1, wherein said recesses or holes formed in said circular member extend in an axial direction of said circular member, and inner walls of said recesses or holes are engaged with at least inner side ends and outer side ends of said plurality of permanent magnets.

3. A magnetic motor according to claim 2, wherein said recesses or holes formed in said circular member are so shaped that they accommodate said plurality of permanent magnets therein such that their inclinations relative to the radial line are different.

4. A magnetic motor according to claim 3, wherein non-magnetic body constituting said circular member is made of carbon resin as a principal component.

5. A magnetic motor according to claim 2, wherein non-magnetic body constituting said circular member is made of carbon resin as a principal component.

6. A magnetic motor according to claim 1, wherein said recesses or holes formed in said circular member are so shaped that they accommodate said plurality of permanent magnets therein such that their inclinations relative to the radial line are different.

7. A magnetic motor according to claim 6, wherein non-magnetic body constituting said circular member is made of carbon resin as a principal component.

8. A magnetic motor according to claim 1, wherein non-magnetic body constituting said circular member is made of carbon resin as a principal component.

* * * * *